United States Patent
Yamaguchi et al.

(10) Patent No.: US 7,101,633 B2
(45) Date of Patent: Sep. 5, 2006

(54) ELECTROPLATED MAGNETIC THIN FILM, METHOD OF MANUFACTURING THE SAME, ELECTROPLATING BATH AND THIN FILM MAGNETIC HEAD

(75) Inventors: Atsushi Yamaguchi, Chuo-ku (JP); Tetsuya Mino, Chuo-ku (JP); Seiji Yari, Chuo-ku (JP); Shigeru Ichihara, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/376,607

(22) Filed: Mar. 3, 2003

(65) Prior Publication Data
US 2004/0080868 A1   Apr. 29, 2004

(30) Foreign Application Priority Data
Mar. 6, 2002 (JP) .............................. 2002-061077
Mar. 22, 2002 (JP) .............................. 2002-080091

(51) Int. Cl.
G11B 5/39 (2006.01)
G11B 5/127 (2006.01)

(52) U.S. Cl. .................. 428/815.2; 428/812; 428/816; 360/119

(58) Field of Classification Search ................ 428/655, 428/678, 686, 692, 693; 360/318; 252/62.55
See application file for complete search history.

(56) References Cited

U.S. PATENT DOCUMENTS

| | | | |
|---|---|---|---|
| 6,538,845 B1 * | 3/2003 | Watanabe et al. | 360/126 |
| 6,760,189 B1 * | 7/2004 | Gotoh et al. | 360/126 |
| 6,765,757 B1 | 7/2004 | Kawasaki et al. | |
| 6,776,891 B1 | 8/2004 | Chen et al. | |
| 2002/0150790 A1 * | 10/2002 | Ikeda et al. | 428/692 |
| 2003/0209295 A1 * | 11/2003 | Cooper et al. | 148/311 |

FOREIGN PATENT DOCUMENTS

| | | |
|---|---|---|
| JP | A 62-256989 | 11/1987 |
| JP | A 3-283013 | 12/1991 |
| JP | A 5-29172 | 2/1993 |
| JP | A 5-190327 | 7/1993 |
| JP | A 6-5423 | 1/1994 |
| JP | A 6-36929 | 2/1994 |
| JP | 2002-280217 | 9/2002 |
| JP | 2003-34891 | 2/2003 |

OTHER PUBLICATIONS

Bozorth, "FERROMAGNETISM", IEEE Press, pp. 160-181.

(Continued)

*Primary Examiner*—Kevin M. Bernatz
(74) *Attorney, Agent, or Firm*—Oliff & Berridge, PLC

(57) ABSTRACT

An electroplated magnetic thin film consisting of an electroplated film of Fe—Co alloy containing Fe by an amount of 52–86 wt % and having a highly packed fine crystal grain structure, a flat and glossy surface, a high saturation magnetic flux density not less than 2.1 T, a low coercive force of 5–10 Oe, and being particularly suitable as a pole portion of a thin film magnetic head is proposed. The electroplated magnetic thin film is deposited on a substrate by an electroplating process with a pulsatory current or direct current having a current density of 3–120 $mA/cm^2$ while using an electroplating bath containing one or both of sulfate salt and hydrochloric salt serving as supply sources of Fe ions and Co ions, saccharin sodium serving as a stress relaxation agent by an amount not less than 1 g/l, boric acid as a pH buffer agent, ammonium chloride as an electrically conductivity salt, and sodium lauryl sulfate as a surfactant.

30 Claims, 13 Drawing Sheets

OTHER PUBLICATIONS

The Surface Finishing Society of Japan Representations at 105th Meeting, Mar. 13-15, 2002 (Manufacture of Plated Magnetic Thin Film of CoFe having High Saturation Magnetic Flux Density, K. Imai et al.) (with abstract).

* cited by examiner

ELECTROPLATED MAGNETIC THIN FILM, METHOD OF MANUFACTURING THE SAME, ELECTROPLATING BATH AND THIN FILM MAGNETIC HEAD

BACKGROUND OF THE INVENTION

1. Field of the Invention

The present invention relates to an electroplated magnetic thin film made of Fe—Co alloy, a method of manufacturing such an electroplated magnetic thin film, an electroplating bath for in such a method, and a thin film magnetic head comprising such an electroplated magnetic thin film constituting at least a pole portion.

2. Related Art Statements

In a hard disk device using a thin film magnetic head, a surface recording density has been increased for attaining a large storage capacity. To this end, a width of a pole portion of an inductive type writing thin film magnetic head (said width determing a width of a record track) has been reduced and there has been proposed a pole portion having a width of sub-micron order. In such a miniaturized thin film magnetic head comprising a pole portion having such a narraw width, magnetic thin films are made of magnetic materials having a very high saturation magnetic flux density.

In a known thin film magnetic head, a permalloy consisting of Fe—Ni alloy is typically utilized. A permalloy having a very high saturation magnetic flux density of 1.5 T (Tesla) has been developed by adjusting a composition such that a content of Fe is set to 50–60 weight %. However, this value of the saturation magnetic flux density is not sufficiently high as a magnetic material for the above mentioned pole portion having a width of sub-micron order.

There has been also proposed a magnetic thin film made of a magnetic material having Fe and Co as main components. Richard M. Bozorth reported in "Ferromagnetism" that a bulk magnetic material made of Fe—Co magnetic alloy containing Fe by an amount of 49–69 weight % has a very high saturation magnetic flux density of about 2.4 T. It should be noted that a magnetic material for use in a thin film magnetic head has to be formed as a thin film, but it is difficult to form a magnetic thin film having a composition identical with a magnetic bulk.

The above mentioned $Fe_{49-69 \, wt \, \%}$—Co electroplated alloy has poor surface flatness and gloss and has a clouded outer appearance. Furthermore, since this alloy is liable to produce coarse crystal grains, its coercive force is extremely high. In order realize a high surface recording density, a magnetic record medium having a high coercive force is used, and therefore a pole portion of a thin film magnetic head should be made of a magnetic material having not only a high saturation magnetic flux density, but also a low coercive force in an axis of hard magnetization. Moreover, a thin film magnetic head is formed by a stack of a plurality of magnetic thin films, and therefore a magnetic thin film should have a flat and glossy surface from a view of manufacturing process.

Techniques for forming a magnetic thin film made of Fe—Co alloy have been disclosed in Japanese Patent Application Laid-open Publications, Kokai Hei 3-283013, 5-190327, 5-29172, 6-5423 and 6-36929.

In the above mentioned Kokai Hei 3-283013, an electroplated magnetic thin film made of Fe—Co alloy is described. In this electroplated magnetic thin film of Fe—Co, in order to reduce a magnetostriction to substantially zero, a content of Fe is set to about 10 wt %. Such an electroplated magnetic thin film made of $Fe_{10 \, wt \, \%}$—Co alloy has a saturation magnetic flux density of about 1.9 T. Although this value of a saturation magnetic flux density is higher than that of conventional magnetic thin films made of permalloys, it is still insufficient for realizing the above mentioned high surface recording density.

The above mentioned Kokai Hei 5-190327 discloses an electroplated magnetic thin film made of Fe—Co containing Rh, Kokai Hei 5-29172 shows electroplated magnetic thin films made of Fe—Co containing Pd, Cu, Pt, Au, Ag, Ir, Rh and Ru, Kokai Hei 6-5423 discloses a magnetic thin film made of Fe—Co including Cu as addition, and Kokai Hei 6-36929 describes an electroplated magnetic thin film made of Fe—Co containing Sn. These magnetic thin films made of alloys containing Fe—Co as a main component have been developed to realize control of magnetostriction, miniaturization of crystal grain, and low coercive force with laminate structure. However, since a deposition potential of Fe and Co differs from a deposition potential of a third element, an amount of a third element could not be controlled easily as compared with a binary alloy of Fe—Co, and thus it is extremely difficult to obtain an electroplated magnetic thin film having desired characteristics.

As explained above, in accordance with the increase in a storage capacity and a surface recording density of a hard disk device, improvement of performance of a thin film magnetic head is required. To this end, there has been proposed a combination type thin film magnetic head instead of an inductive thin film magnetic head performing both recoding and reading. Such a combination type thin film magnetic head comprises a stack of a recording thin film head consisting of an inductive type thin film magnetic head element for recording magnetic information and a reproducing thin film head including a magnetoresistive type element for reading magnetic information (the later element is simply called MR element).

As stated above, a magnetic material constituting a pole portion of a head core of an inductive type thin film magnetic head is required to have lower coercive force, high permeability, and high saturation magnetic flux density. Furthermore, a magnetic material having a small magnetostriction is preferably used. The most important factor of the inductive type magnetic converting element in the combination type thin film magnetic head is to increase a surface recording density. To this end, various characteristics of known magnetic materials for the inductive type magnetic converting element should be checked again and suitable magnetic materials which can realize a much higher surface recording density should be proposed, while considering a special structure of the combination type thin film magnetic head.

SUMMARY OF THE INVENTION

The present invention has for its object to provide an electroplated magnetic thin film having a flat surface, a sufficient gloss, a condensed and miniaturized crystal grain structure, and a high saturation magnetic flux density.

It is another object of the invention to provide a method of manufacturing the above mentioned electroplated magnetic thin film having superior characteristics in an easy and reproducible manner and to provide an electroplating bath for used in such a method.

It is another object of the invention to provide a thin film magnetic head including a pole portion having a flat surface, a sufficient gloss, a condensed and miniaturized crystal grain structure, a high saturation magnetic flux density and a low coercive force for realizing a high density recording with a narrow track.

It is still another object of the invention to provide a combination type thin film magnetic head including an inductive type thin film converting element having an improved overwrite property, i.e. improved specifications suitable for attaining a much higher recording density.

According to the invention, an electroplated magnetic thin film is consisting of an electroplated film of Fe—Co alloy containing Fe by an amount of 52–86 wt % and having a highly packed fine crystal grain structure and a flat and glossy surface.

Such an electroplated magnetic thin film according to the invention has preferably a saturation magnetic flux density not less than 2.1 T and a coercive force in an axis of hard magnetization of 5–10 Oe.

According to the invention, an electroplated magnetic thin film is consisting of an electroplated film of Fe—Co alloy containing Fe by an amount of 58–70 wt % and having a highly packed fine crystal grain structure and a flat and glossy surface.

Such an electroplated magnetic thin film according to the invention has preferably a saturation magnetic flux density not less than 2.2 T and a coercive force in an axis of hard magnetization of 5–10 Oe.

According to the invention, a method of manufacturing an electroplated magnetic thin film uses a pulsatory current as an electroplating current and deposits, on a substrate, a magnetic thin film made of Fe—Co alloy containing Fe by an amount of 52–86 wt % and having a highly packed fine crystal grain structure, a flat and glossy surface and a saturation magnetic flux density not less than 2.1 T.

According to the invention, a method of manufacturing an electroplated magnetic thin film uses an electroplating bath containing one or both of sulfate salt and hydrochloric salt serving as a supply source of Fe ions and Co ions, saccharin sodium serving as a stress relaxation agent by not less than 1 g/l and at least one of a pH buffer agent, an electrically conductive salt and a surfactant, and uses a pulsatory electric current or a direct current to deposit, on a substrate, a magnetic thin film made of Fe—Co alloy containing Fe by an amount of 52–86 wt % and having a highly packed fine crystal grain structure, a flat and glossy surface and a saturation magnetic flux density not less than 2.1 T.

In such a method of manufacturing a magnetic thin film according to the invention, an amount of Fe can be controlled to a value within a range of 58–78 wt % by adjusting a ratio of Fe ions and Co ions, and an electroplated magnetic thin film having a saturation magnetic flux density not less than 2.2 T can be manufactured by adjusting a current density of the pulsatory current or D.C. current to a value within a range of 3–120 mA/cm$^2$. Furthermore, when a current density is adjusted to a value not less than 20 mA/cm$^2$, it is possible to manufacture a magnetic thin film having a low coercive force of 5–10 Oe.

In a preferable embodiment of the method of manufacturing a magnetic thin film according to the invention, a magnetic thin film made of Fe—Co alloy is formed by a paddle plating process, in which a cathode electrode formed by a stack of a Cu film of 150 nm and a Ti film of 5 nm deposited on a glass or Si substrate and an anode electrode made of Co are immersed in an electroplating bath arranged in a magnetic field, a paddle holding a plurality of wafers made of AlTiC is arranged on the cathode electrode and is rotated at a given rotational speed, and a pulsatory electric current or a direct current is supplied between the anode electrode and the cathode electrode. In this case, use may be preferably made of an electroplating bath which contains iron sulfate, 7-hydrate as sulfate salt serving as the supply source of Fe ions, cobalt sulfate, 7-hydrate and cobalt chloride, 6-hydrate as a sulfate salt and a hydrochloric salt serving as the supply source of Co ions, boric acid as a pH buffer agent for adjusting pH of the electroplating bath, ammonium chloride serving as an electrically conductive salt for adjusting an electric conductivity of the electroplating bath, sodium lauryl sulfate as a surfactant, and saccharin sodium as a stress relaxation agent.

According to the invention, an electroplating bath for use in manufacturing a magnetic thin film made of Fe—Co alloy containing Fe by an amount of 52–86 wt % and having a highly packed fine crystal grain structure, a flat and glossy surface and a saturation magnetic flux density not less than 2.1 T, wherein said bath contains one or both of sulfate salt and hydrochloric salt serving as supply sources of Fe ions and Co ions, saccharin sodium serving as a stress relaxation agent by not less than 1 g/l, and at least one of a pH buffer agent, an electrically conductive salt and a surfactant Such an electroplating bath according to the invention may preferably contain boric acid as a pH buffer agent, ammonium chloride as an electrically conductive salt, and sodium lauryl sulfate as a surfactant, i.e. surface active agent.

According to the invention, a thin film magnetic head comprises:

a first magnetic thin film having a pole portion which is to be opposed to a magnetic record medium;

a second magnetic thin film having a pole portion constituting an air bearing surface together with the pole portion of the first magnetic thin film, and being magnetically coupled with the first magnetic thin film at a back gap position remote from the air bearing surface;

a write gap film made of a non-magnetic material and interposed between the pole portion of the first magnetic thin film and the pole portion of the second magnetic thin film at at least the air bearing surface;

a thin film coil having a portion arranged between said first magnetic thin film and the second magnetic thin film in an insulated and isolated manner; and a substrate supporting said first and second magnetic thin films, write gap film and thin film coil;

wherein one or both of said first and second magnetic thin film is formed by an electroplated magnetic thin film made of Fe—Co alloy containing Fe by an amount of 52–86 wt % and having a highly packed fine crystal grain structure, a flat and glossy surface and a saturation magnetic flux density not less than 2.1 T.

In the thin film magnetic head according to the invention, said electroplated magnetic thin film is preferably formed by an electroplated magnetic thin film having a saturation magnetic flux density not less than 2.2 T and a coercive force in an axis of hard magnetization of 5–10 Oe.

In such a thin film magnetic head according to the invention, a pole portion or pole portions of one or both of the first and second magnetic thin films are formed by an electroplated film of Fe—Co having a flat and glossy surface and a highly packed fine crystal grain structure, and thus the pole portion can be miniaturized and can have a very small width in the order of submicrons. Furthermore, a very high saturation magnetic flux density not less than 2.1 T can be attained, and at the same time a coercive force in an axis of hard magnetization can be decreased to a value within a range of 5–10 Oe. In this manner, it is possible to realize an extremely narrow track width for attaining a very high recording density.

In a preferable embodiment of the thin film magnetic head according to the invention, the thin film magnetic head is formed as a combination type thin film magnetic head, in which a magnetoresistive type thin film magnetic head element for reading magnetic information out of a magnetic record medium and an inductive type thin film magnetic head element for recoding the magnetic information on the magnetic record medium are stacked one on the other on a substrate.

In a preferable embodiment of such a combination type thin film magnetic head, said second magnetic thin film opposite to the magnetoresistive type thin film magnetic head element for reading the magnetic information recorded on the magnetic record medium with respect to the write gap film may be preferably formed by an electroplated magnetic thin film of Fe—Co alloy containing Fe by 52–86 wt %. In order to form such an electroplated thin film, a seed layer serving as one of the electroplating electrodes has to be deposited on a surface of an underlying film.

The inventors of the present invention have conducted various experiments and analyses and have confirmed that magnetic characteristics of the seed layer also contribute to the performance of the thin film magnetic head. In a preferable embodiment of the thin film magnetic head according to the invention, at least a pole portion of said second magnetic thin film opposite to the magnetoresistive type thin film magnetic head element with respect to the write gap film is consisting of a seed layer formed by a sputtered thin film of Fe—Co alloy containing Fe by 52–86 wt % and an electroplated thin film of Fe—Co containing Fe by 52–86 wt %, said sputtered thin film of Fe—Co alloy containing oxygen by an amount of 0.01–5.0 atomic % measured at a position which is substantially on the air bearing surface and is separated from a reference point by 25 nm, said reference point situating on a bisecting center line of a width of the pole portion as well as on a boundary surface between the second magnetic thin film and the write gap film.

In such a combination type thin film magnetic head, said sputtered film of Fe—Co alloy serving as the seed layer has preferably a coercive force in an axis of easy magnetization of 400 A/n–16000 A/m (50–2000 Oe).

In the combination type thin film magnetic head according to the invention, the sputtered film of Fe—Co alloy serving as the seed layer has a thickness of at least 30 nm, but may be 30–500 nm.

The above mentioned sputtered film of Fe—Co alloy serving as the seed layer may be formed by deposition within vacuum, and may be preferably formed by sputtering. In this case, an amount of oxygen contained in the seed layer may be limited to the above mentioned value by increasing a degree of vacuum.

BRIEF DESCRIPTION OF THE DRAWINGS

FIGS. 9A, 9B–14A, 14B are cross sectional views illustrating successive steps of a method of manufacturing an embodiment of the combination type thin film magnetic head according to the invention by cutting along a plane perpendicular to the air bearing surface and along a plane parallel with the air bearing surface.

DESCRIPTION OF THE PREFERRED EMBODIMENTS

Figure 1:
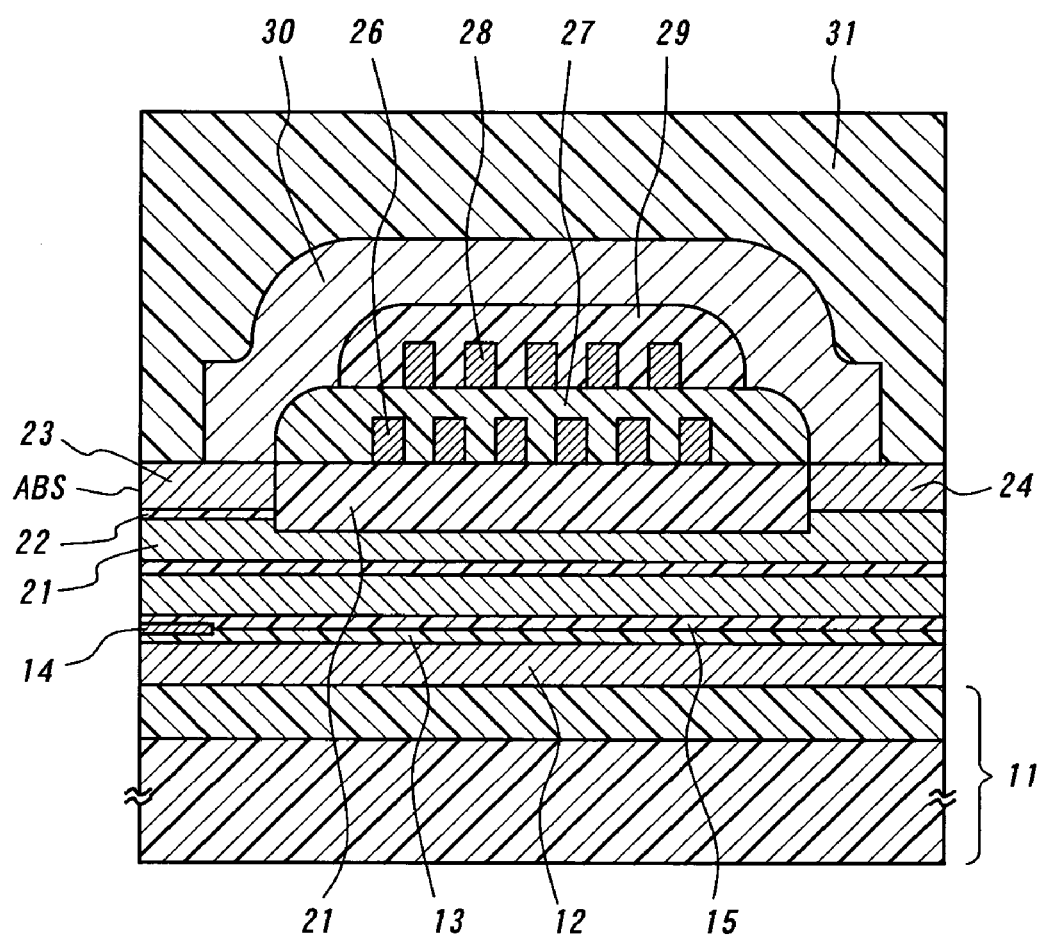
FIG. 1 is a cross sectional view showing an embodiment of the thin film magnetic head according to the invention comprising the electroplated magnetic thin film of Fe—Co alloy according to the invention by cutting along a plane perpendicular to the air bearing surface.
Figure 2:
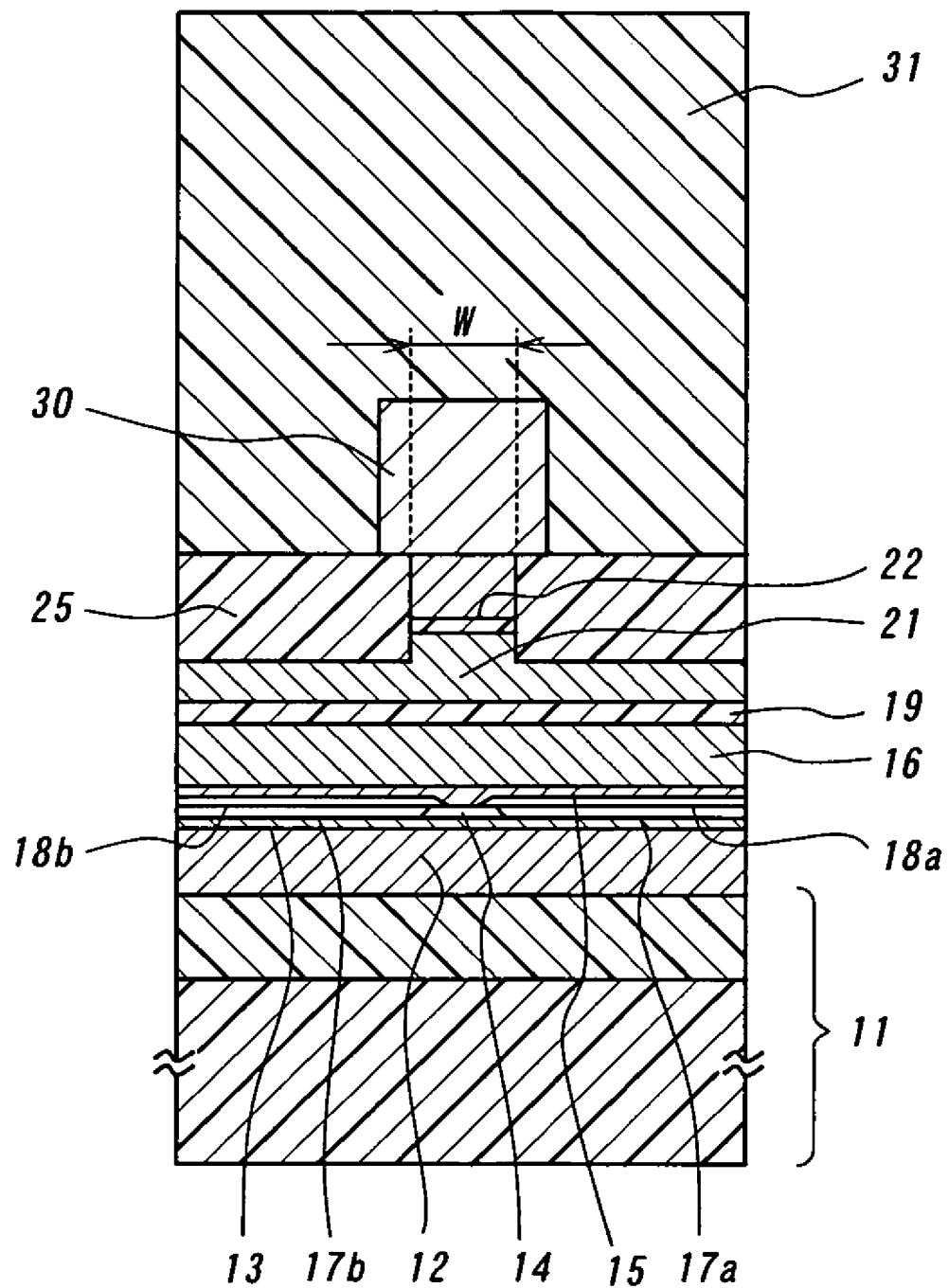
FIG. 2 is also a cross sectional view cut along a plane parallel with the air bearing surface.

FIGS. 1 and 2 are cross sectional views showing an embodiment of the thin film magnetic head according to the invention comprising the magnetic thin film of Fe—Co alloy according to the invention. FIG. 1 a cross section cut along a plane perpendicular to the air bearing surface and FIG. 2 is a cross section cut along a plane parallel with the air bearing surface. In the present embodiment, the thin film magnetic head is formed as a combination type thin film magnetic head of normal type including a giant magnetoresistive type reading thin film magnetic head element (GMR element) formed on a substrate and an inductive type recording thin film magnetic head element stacked on the GMR element.

A GMR element is formed on a substrate 11 consisting of a main body made of AlTiC and an alumina insulating film formed on one surface of the main body, and an inductive type thin film magnetic head element is stacked on the GMR element. The GMR element comprises a bottom shield film 12 formed on the substrate 11, a bottom shield gap film 13 made of an insulating material and formed on the bottom shield film, a GMR film 14 formed on the bottom shield gap film, a top shield gap film 15 formed to cover the GMR film, and a top shield film 16 formed on the top shield gap film.

The GMR film 14 has a multiple-layer structure, and longitudinal bias applying films 17a, 17b are provided on respective sides of the GMR film and electrode films 18a, 18b are provided to extend over the GMR film beyond the longitudinal bias applying films. In the present embodiment, the GMR element is formed as a tunnel type having the lead overlay structure, but it may be formed by another type GMR element or anisotropic magnetoresistive type MR element.

In order to magnetically separate the MR element formed in a manner mentioned above from an inductive type reading thin film magnetic head element, a separation film 19 made of a non-magnetic material is formed on the top shield film 16, and the inductive type writing thin film magnetic head element is formed on the separation film 19. The inductive type thin film magnetic head element comprises a bottom pole 21 made of a permalloy (FeNi) and formed on the separation film 19, a write gap film 22 made of a non-magnetic material, e.g. alumina and formed on the bottom pole, and a pole chip 23 provided on the write gap film and formed by the an electroplated magnetic thin film of Fe—Co alloy according to the invention. A width of track is determined by a width W of the pole chip 23, and therefore this width W should be small in the order of submicron order to realize a high surface recording density. During the formation of the pole chip 23, a bridge member 24 for magnetically coupling the bottom pole 21 to a top pole to be formed later.

In order to suppress a widening of an effective track width, that is to say, in order to avoid a widening of a magnetic flux at one pole during the writing, an etching such as ion milling and reactive ion etching is performed while the pole chip 23 is used as an etching mask to remove a portion of the write gap film 22 surrounding the pole chip and an underlying surface of the bottom pole 21 is removed over a part of its thickness to form a so-called trim structure. After that, an alumina insulating film 25, and then a whole surface is flattened by CMP to expose a coplanar flat surface pole chip 23 and insulating film 25.

Next, a first layer thin film coil 26 is formed on the flat surface of the insulating film 25 such that coil windings are supported to be mutually isolated and separated by an insulating film 27. Then, a surface of the insulating film 27 is flattened, and a second layer thin film coil 28 is formed on the flattened surface such that coil windings are mutually isolated and separated by an insulating film 29.

Then, a surface of the insulating film 29 supporting the second layer thin film coil 28 by sintering at, for instance 250° C., and a top pole 30 made of a permalloy is selectively formed on the pole chip 23 and insulating films 27, 29 in accordance with a given pattern. Next, an overcoat film 31 made of alumina is formed on a whole surface.

In an actual process of manufacturing the thin film magnetic head, after forming a number of thin film magnetic head elements on a wafer constituting the substrate 11, the wafer is divided into bars and a side wall of a bar is polished to form an air bearing surface ABS which is to be opposed to a magnetic record medium. During the formation of the air bearing surface, The GMR film 14 is also polished to determine a throat height TH and a MR height MRH. In an actual thin film magnetic head, pads for establishing electrical connections to the thin film coil 26, 28 and electrode films 18a, 18b of the GMR element are provided, but in the drawings these pads are dispensed with. Furthermore, a front end of the top pole 30 is retarded from the air bearing surface for preventing the writing operation from being affected by a magnetic flux leakage from the front end of the top pole.

As explained above, in the thin film magnetic head according to the invention, the pole chip 23 of the inductive type thin film magnetic head element is formed by an electroplated magnetic thin film made of Fe—Co alloy containing Fe by an amount of 52–86 wt % and having a highly packed fine crystal grain structure, a flat and glossy surface, a saturation magnetic flux density not less than 2.1 T and a coercive force in an axis of hard magnetization of 5–10 Oe. Then, information can be written on a magnetic record medium having a high coercive force with a very high surface recording density such as several Gb/in$^2$. In this case, the pole chip 23 may be preferably formed by an electroplated magnetic thin film made of Fe—Co alloy containing Fe by an amount of 58–70 wt % and having a very high saturation magnetic flux density not less than 2.2 T. Upon forming such an electroplated magnetic thin film, it is required to form a seed layer on an underlying film, and the seed layer will be discussed later.

Now several embodiments of the method of manufacturing a magnetic thin film according to the invention will be explained together with electroplating baths used in these embodiments. In these embodiments, electroplated magnetic thin films made of Fe—Co alloy are formed by a paddle plating, in which a cathode electrode formed by a stack of a Cu film of 150 nm and a Ti film of 5 nm deposited on a glass or Si substrate and an anode electrode made of Co are immersed in an electroplating bath arranged in a magnetic field for applying a magnetic anisotropy to the deposited magnetic thin films, a paddle holding a plurality of wafers made of AlTiC is arranged on the cathode electrode and is rotated at a given rotational speed, and an pulsatory electric current or a direct current is supplied between the anode electrode and the cathode electrode. In this case, use is made of an electroplating bath which contains iron sulfate, 7-hydrate serving as a sulfate constituting a supply source of Fe ions, cobalt sulfate, 7-hydrate serving as a sulfate constituting a supply source of Co ions, cobalt chloride, 6-hydrate serving as a hydrochloric salt constituting a supply source of Co ions, boric acid serving as a pH buffer agent for adjusting pH of the electroplating bath, ammonium chloride serving as an electrically conductive salt for adjusting an electric conductivity of the electroplating bath, sodium lauryl sulfate serving as a surfactant, and saccharin sodium serving as a stress relaxation agent.

First Embodiment Group

In a first embodiment group, use are made of electroplating baths having compositions shown in a table 1, and an amount of saccharin sodium serving as a stress relaxation agent is changed within a range of 0–5 g/l.

TABLE 1

| Reagent | Concentration (g/l) |
|---|---|
| iron sulfate, 7-hydrate | 28 |
| cobalt sulfate, 7-hydrate | 14 |
| cobalt chloride, 6-hydrate | 12 |
| boric acid | 30 |
| ammonium chloride | 30 |
| sodium lauryl sulfate | 0.01 |
| saccharin sodium | 0–5 |

The electroplating is performed under the condition shown in the following table 2. Between the anode and the cathode is flown a direct current having a current density of 3 mA/cm$^2$.

TABLE 2

| | |
|---|---|
| Bath temperature | 22° C. |
| Bath pH | 3.0 |
| Anode material | Co |
| Current density | 3 mA/cm$^2$ |
| Bath flow rate | 15 l/min |
| Paddle speed | 120 rpm |

A pH value of the electroplating bath may be controlled by adjusting an amount of boric acid serving as the pH buffer agent. However, when pH is set to a value higher than 3.0, metal ions contained in the electroplating bath are altered into hydroxide and insoluble sediment is deposited. Therefore, pH is set to a value within a range of 2–3. In the first embodiment group, pH is set to 3.0 as represented in the table 2.

In order to derive necessary conditions for manufacturing a magnetic thin film of Fe—Co alloy having a flat and glossy surface, an amount of saccharin sodium serving as the stress relaxation agent is changed in the first embodiment group. Results of obtained magnetic thin films are depicted in a table 3. These magnetic thin films have a thickness of about 500 nm.

TABLE 3

| Concentration of saccharin sodium (g/l) | Surface condition |
|---|---|
| 0 | Not glossy, but clouded |
| 0.5 | Slightly clouded |
| 1 | Glossy |
| 2 | Glossy |
| 3 | Glossy |
| 5 | Glossy |

As can be seen from the table 3, when saccharin sodium serving as the stress relaxation agent is not added at all or is added slightly not larger than 1 g/l, a surface of magnetic thin film has no gloss and becomes clouded. Therefore, in the electroplating bath according to the invention, saccharin sodium is added by an amount not less than 1 g/l as the stress relaxation agent.

Second Embodiment Group

In a second embodiment group, electroplating baths having compositions shown in a table 4 are used. An amount of saccharin sodium serving as a stress relaxation agent is set to a constant value of 2 g/l. Magnetic thin films in the second embodiment group have a thickness of about 500 nm.

TABLE 4

| Reagent | Concentration (g/l) |
|---|---|
| iron sulfate, 7-hydrate | 28 |
| cobalt sulfate, 7-hydrate | 14 |
| cobalt chloride, 6-hydrate | 12 |
| boric acid | 30 |
| ammonium chloride | 30 |
| sodium lauryl sulfate | 0.01 |
| saccharin sodium | 2 |

Electroplating is conducted under a condition represented in the following table 5. That is to say, in the second embodiment group, a current density of a direct current flowing between the anode and the cathode is changed within a range of 3–120 mA/cm². Electroplating baths are kept at a temperature of 21° C. and pH is adjusted to 2.5.

TABLE 5

| bath temperature | 21° C. |
|---|---|
| bath pH | 2.5 |
| anode material | Co |
| current density | 3–120 mA/cm² |
| bath flow rate | 15 l/min |
| paddle speed | 120 rpm |

As stated above, while the current density is changed within a range of 3–120 mA/cm², electroplated magnetic thin films have surface conditions shown in a table 6. As can be understood from the table 6, when a current density is set to a value within a range of 3–120 mA/cm², electroplated magnetic thin films have a good surface condition.

TABLE 6

| Current density | Surface condition |
|---|---|
| 3 | Glossy |
| 6 | Glossy |
| 9 | Glossy |
| 12 | Glossy |
| 17 | Glossy |

TABLE 6-continued

| Current density | Surface condition |
|---|---|
| 23 | Glossy |
| 58 | Glossy |
| 92 | Glossy |
| 120 | Glossy |

Third Embodiment Group

In a third embodiment group, use a made of the same electroplating baths which are used in the second embodiment group and are indicated in the table 4. The electroplated magnetic thin films are all have a thickness of about 500 nm.

Figure 3:
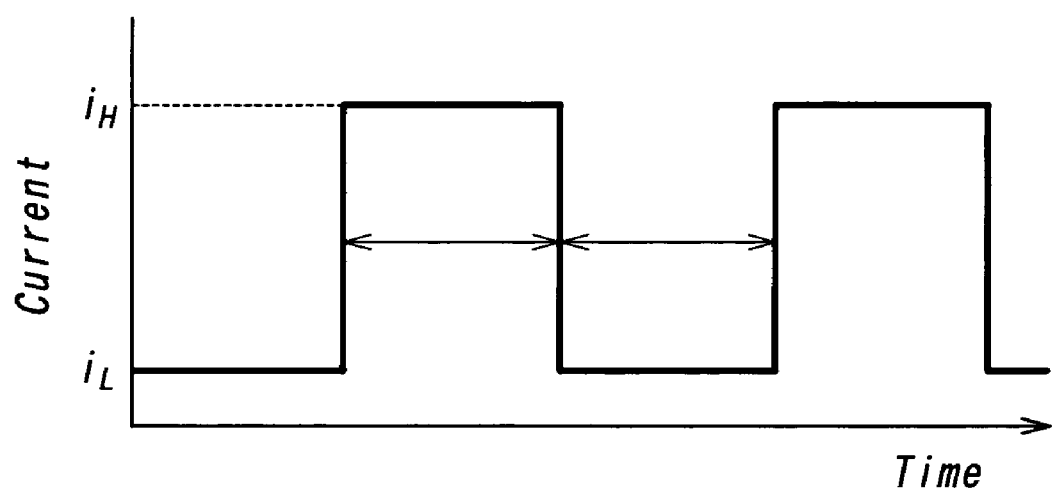
FIG. 3 is a diagram illustrating a waveform of a pulsatory electric current for use in the method of manufacturing the magnetic thin film according to the invention.

In the above mentioned first and second embodiment groups, a direct current is flowed between the electrode, and in the third embodiment group, a pulsatory current is flowed between the anode and the cathode. This pulsatory current includes a high current level and a low current level which appear alternately with identical time durations as illustrated in FIG. 3. Although a current density $i_L$ of the low current level is kept constant, a current density $i_H$ is changed to various values. In the third embodiment group, a current density $i_L$ of the low current level is set to 0.6 mA/cm² at which no electroplating occurs, but according to the invention, a current density $i_L$ may be set to any value lower than a threshold value at which the electroplating segmentation and an etching by electroplating baths becomes equilibrium and the electroplating does not substantially occur. Furthermore, a current density $i_L$ of the low current level may be set to zero or a negative value. In the latter case, a surface of an electroplated thin film is slightly etched. In the third embodiment group, a time duration T of the high current level and low current level is changed to various values. Electroplating baths are kept at a temperature of 22° C. and pH is set to 2.5. Electroplating conditions of the third embodiment group are listed in the following table 7.

TABLE 7

| bath temperature | 22° C. |
|---|---|
| bath pH | 2.5 |
| anode material | Co |
| high current density | 12, 23, 58, 92 mA/cm² |
| low current density | 0.6 mA/cm² |
| time duration T | 50, 500, 5000 ms |
| bath flow rate | 15 l/min |
| paddle speed | 120 rpm |

By analyzing results of the third embodiment group, it has been confirmed that densely packed fine crystal grains can be obtained by intermittently stopping a growth of crystal grains by a pulsatory current in which a current level is instantaneously shutdown or decreased.

Furthermore, when a time duration T is set to 5000 ms, it is possible to obtain electroplated magnetic thin films having glossy surfaces which are substantially identical with those obtained in the first and second embodiment groups using a direct current. By reducing a time duration T to 500 ms and 50 ms, electroplated magnetic thin films having surface which is much more glossy can be attained.

Figure 4:
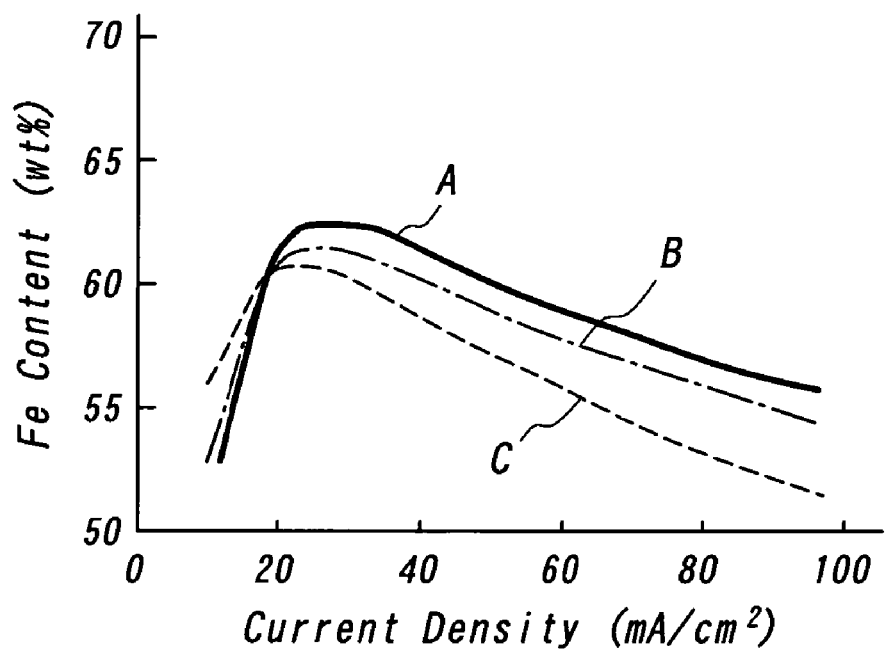
FIG. 4 is a graph representing a relationship between a pulse current density and an amount of Fe with a parameter of a time duration of the pulsatory current.

FIG. 4 is a graph showing relationships between a current density $i_H$ of a high current level and an amount of Fe contained in the Fe—Co thin films in the third embodiment group, while a time duration T is taken as a parameter. Curves A, B and C represent cases in which a time duration T is set to 50 nm, 500 nm and 5000 nm, respectively. In any time duration, an amount of Fe increases up to about 20 mA/cm², and then decreases monotonously in accordance with an increase in a current density $i_H$.

Figure 5:
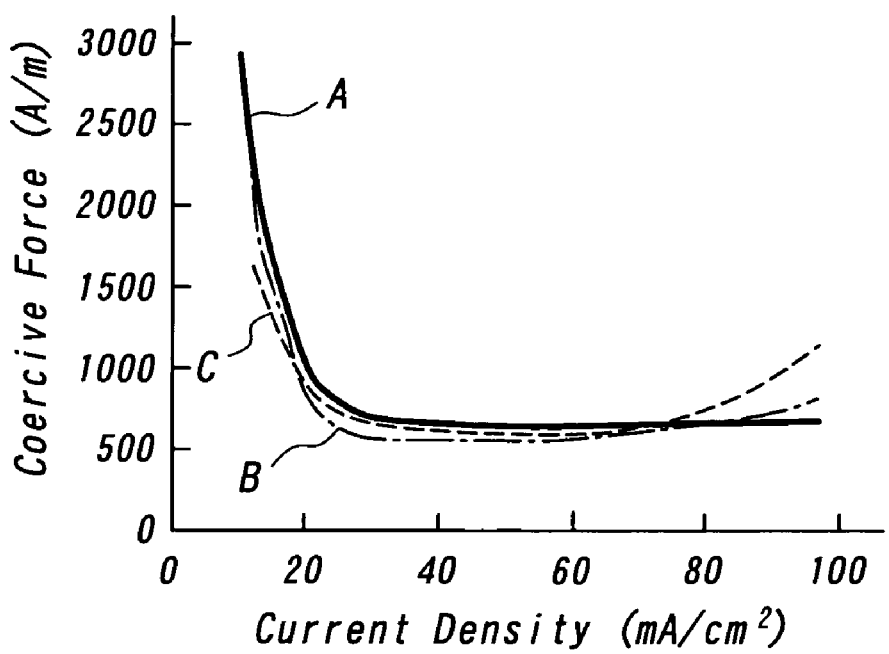
FIG. 5 is a graph showing a relationship between a pulsatory current density and a coercive force with a parameter of a time duration of the pulsatory current.

FIG. 5 is a graph showing a relationship between a current density $i_H$ of a high current level and a coercive force in an axis of hard magnetization in the Fe—Co thin films in the third embodiment group, while a time duration T is taken as a parameter. Curves A, B and C represent cases in which a time duration T is set to 50 nm, 500 nm and 5000 nm, respectively. In any time duration, when a current density $i_H$ is low, the magnetic thin films show a very high coercive force, but a coercive force decreases abruptly in accordance with an increase in a current density. For a current density not less than 20 mA/cm², a coercive force is not larger than 800 mA/cm². Therefore, in a thin film magnetic head having a very narrow track width for a high recording density, a pole portion has to be made of a magnetic material having a low coercive force, and thus a current density $i_H$ of a high current level of a pulsatory current should preferably be not less than 20 mA/cm².

Fourth Embodiment Group

In a fourth embodiment group, amounts of iron sulfate, 7-hydrate, cobalt sulfate, 7-hydrate serving and cobalt chloride, 6-hydrate are changed in various ways to change a ratio between Fe ions and Co ions. Amounts of the remaining components of electroplating baths are identical with those shown in the table 4 of the second embodiment group. Both a direct current and a pulsatory current are used and these currents have a current density not less than 20 mA/cm². A time duration T of a pulsatory current is set to 50 ms. Composition ratios of Fe in magnetic thin films of Fe—Co alloy in the fourth embodiment group are within a range of 50–70 wt %.

Electroplating conditions and various characteristics of magnetic thin films of the fourth embodiment group are shown in the following table 8. In this table 8, Pulse represents a case using a pulsatory current, DC denotes a case using a direct current, and FC ratio represents a ratio of Fe ions to all the remaining metal ions in an electroplating bath. ID represents a current density, and when a pulsatory current is used, ID denotes a current density $i_H$ of a high current level as explained above. A time duration T of a pulsatory current is set to 50 mA/cm². A saturation magnetic flux density Bs is measured with a vibrating sample magnetometer (VSM) while a magnetic field of 10 kOe is applied. A coercive force $H_{ch}$ and an anisotropic magnetic field $H_{kh}$ are measured with a B-H tracer under a magnetic field of 100 Oe.

TABLE 8

| current | FC ratio | current density (ma/cm²) | T (ms) | Fe amount (wt %) | Bs at 10kOe (T) | $H_{ch}$ (A/m) | $H_{kh}$ (A/m) |
|---|---|---|---|---|---|---|---|
| Pulse | 0.50 | 57.8 | 50 | 59.10 | 2.19 | 695 | 1118 |
|  | 0.50 | 92.5 | 50 | 56.12 | 2.15 | 675 | 1269 |
|  | 0.62 | 57.8 | 50 | 66.80 | 2.23 | 517 | 640 |
|  | 0.65 | 57.8 | 50 | 71.35 | 2.18 | 595 | 419 |
|  | 0.69 | 57.8 | 50 | 74.72 | 2.15 | 630 | 288 |
|  | 0.71 | 57.8 | 50 | 77.14 | 2.14 | 662 | 271 |
|  | 0.75 | 57.8 | 50 | 81.06 | 2.09 | 732 | 242 |
|  | 0.78 | 57.8 | 50 | 83.96 | 2.10 | 743 | 224 |
|  | 0.78 | 46.2 | 50 | 84.14 | 2.10 | 717 | 209 |
|  | 0.82 | 57.8 | 50 | 86.74 | 2.07 | 802 | 241 |
|  | 0.50 | 57.8 | 50 | 59.43 | 2.21 | 600 | 1022 |
|  | 0.50 | 46.2 | 50 | 60.19 | 2.20 | 609 | 937 |
|  | 0.50 | 34.7 | 50 | 61.31 | 2.22 | 648 | 1031 |

TABLE 8-continued

| current | FC ratio | current density (ma/cm²) | T (ms) | Fe amount (wt %) | Bs at 10kOe (T) | $H_{ch}$ (A/m) | $H_{kh}$ (A/m) |
|---|---|---|---|---|---|---|---|
|  | 0.44 | 57.8 | 50 | 53.74 | 2.09 | 919 | 1159 |
|  | 0.47 | 57.8 | 50 | 56.58 | 2.18 | 621 | 1201 |
|  | 0.52 | 57.8 | 50 | 61.56 | 2.20 | 568 | 1007 |
|  | 0.55 | 57.8 | 50 | 63.51 | 2.22 | 477 | 711 |
|  | 0.57 | 57.8 | 50 | 65.54 | 2.22 | 485 | 625 |
|  | 0.58 | 57.8 | 50 | 67.08 | 2.21 | 679 | 571 |
|  | 0.60 | 57.8 | 50 | 70.22 | 2.19 | 700 | 408 |
|  | 0.60 | 57.8 | 50 | 70.68 | 2.20 | 648 | 497 |
| DC | 0.44 | 28.9 |  | 50.10 | 2.05 | 776 | 989 |
|  | 0.58 | 28.9 |  | 63.81 | 2.19 | 634 | 561 |
|  | 0.55 | 46.2 |  | 60.39 | 2.18 | 550 | 950 |
|  | 0.58 | 34.7 |  | 65.94 | 2.19 | 591 | 690 |
|  | 0.62 | 34.7 |  | 68.91 | 2.22 | 677 | 572 |

Figure 6:
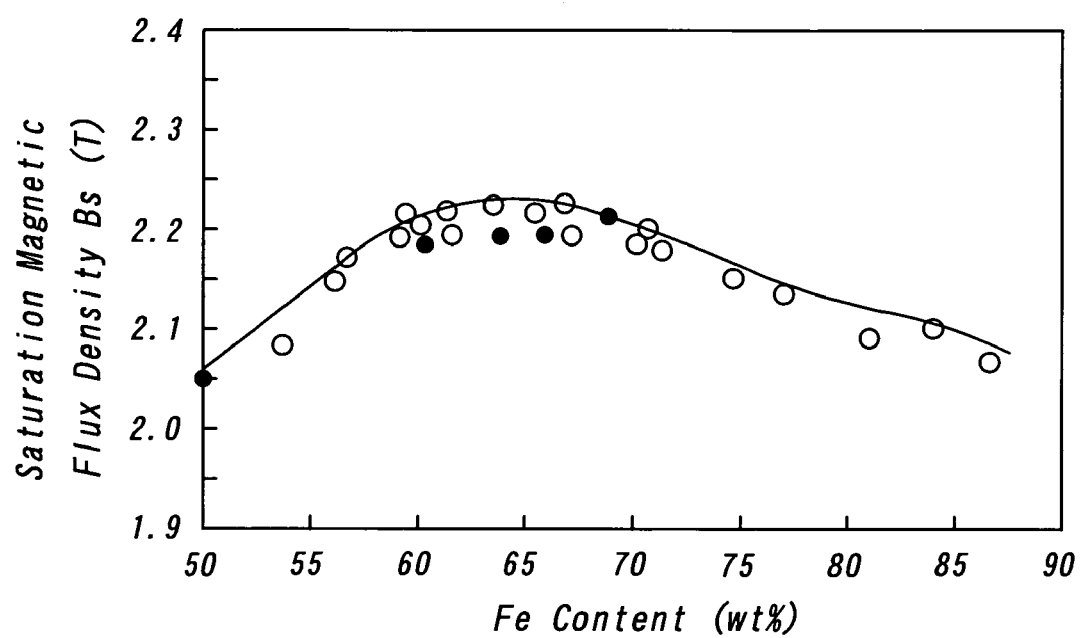
FIG. 6 is a graph depicting a relationship between an amount of Fe and a saturation magnetic flux density.

Vacant circles and black dots in FIG. 6 represent a saturation magnetic flux density for various amounts of Fe contained in magnetic thin films formed by using a pulsatory current and a direct current, respectively. In either cases using a pulsatory current and a direct current, saturation magnetic flux densities are substantially identical and have a tendency shown by curves. When an amount of Fe is in a range of 52–86 wt %, it has been confirmed that a very high saturation magnetic flux density not less than 2.1 T, but from a view point of surface gloss, a pulsatory current may be preferably utilized. Particularly, when an amount of Fe is set to a value within a range of 58–72 wt %, it is possible to attain an extremely high saturation magnetic flux density not less than 2.2 T.

Figure 7:
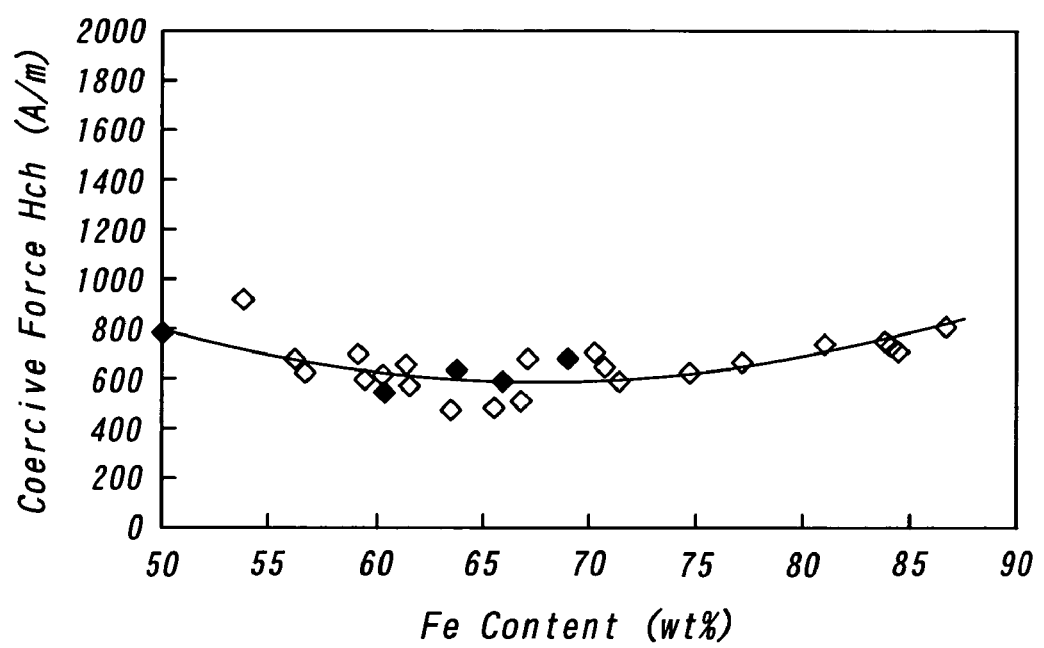
FIG. 7 is a graph representing a relationship between an amount of Fe and a coercive force.
Figure 8:
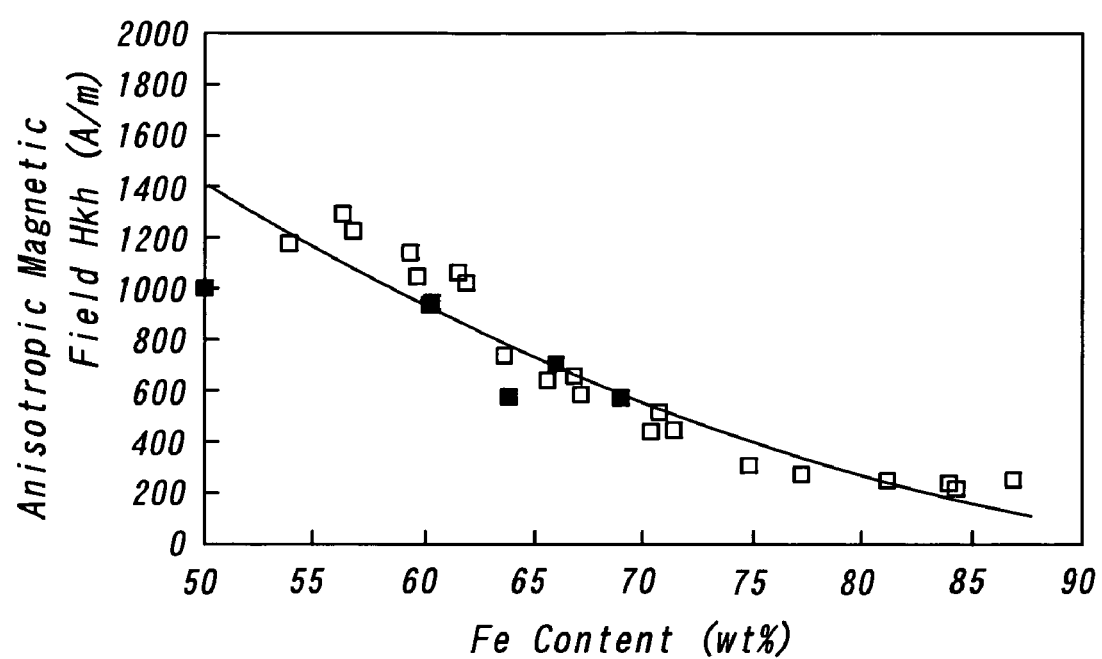
FIG. 8 is a graph showing a relationship between an amount of Fe and a magnetic anisotropy.

Vacant circles and black dots in FIG. 7 denote a coercive force for various amounts of Fe contained in magnetic thin films formed by using a pulsatory current and a direct current, respectively. Any significant difference could be recognized n a coercive force between a pulsatory current and a direct current. As typically shown by curves, it has been confirmed that a low coercive force not higher than 800 A/m is obtained when an amount of Fe is set to a value within a range of 50–86 wt %.

Vacant circles and black dots in FIG. 7 represent an isotropic magnetic field $H_{kh}$ for various amounts of Fe contained in magnetic thin films formed by using a pulsatory current and a direct current, respectively. Also in an isotropic magnetic field, any remarkable difference could not be found between a pulsatory current and a direct current. As typically illustrated by curves, an isotropic magnetic field is 200–1300 A/m when an amount of Fe is set to a value within a range of 50–86 wt %.

From the above explained results and other experiments and analyses, it has been found that an electroplated magnetic thin film made of Fe—Co alloy containing Fe by an amount of 52–86 wt % has a high saturation magnetic flux density not less than 2.1 T and a low coercive force in an axis of hard magnetization not higher than 800 A/m, and therefore is quite suitable for a pole portion of a thin film magnetic head. Furthermore, by limiting an amount of Fe to a range of 58–72 wt %, magnetic thin films can have an extremely high saturation magnetic flux density not less than 2.2 T, and can be effectively used for a pole portion of a thin film magnetic head having a very narrow track width in the order of submicrons.

Now successive steps of manufacturing an embodiment of the combination type thin film magnetic head according to the invention will be explained with reference to FIGS. 9–14.

In FIGS. 9–14, A represents a cross sectional view cut along a line perpendicular to an air bearing surface to be opposed to a magnetic record medium and B denotes cross sectional views cut along a central line parallel with the air bearing surface.

In the following explanation, a direction of X axis is termed as "width (or width direction)", a direction of Y axis as "length (or length direction)", and a direction of Z axis is called "thickness (or thickness direction)". In Y direction, a side on the air bearing surface (or a surface which is formed as the air bearing surface) is termed as "front (or forward)" and an opposite side is termed as "back (or backward)".

Figure 9A:
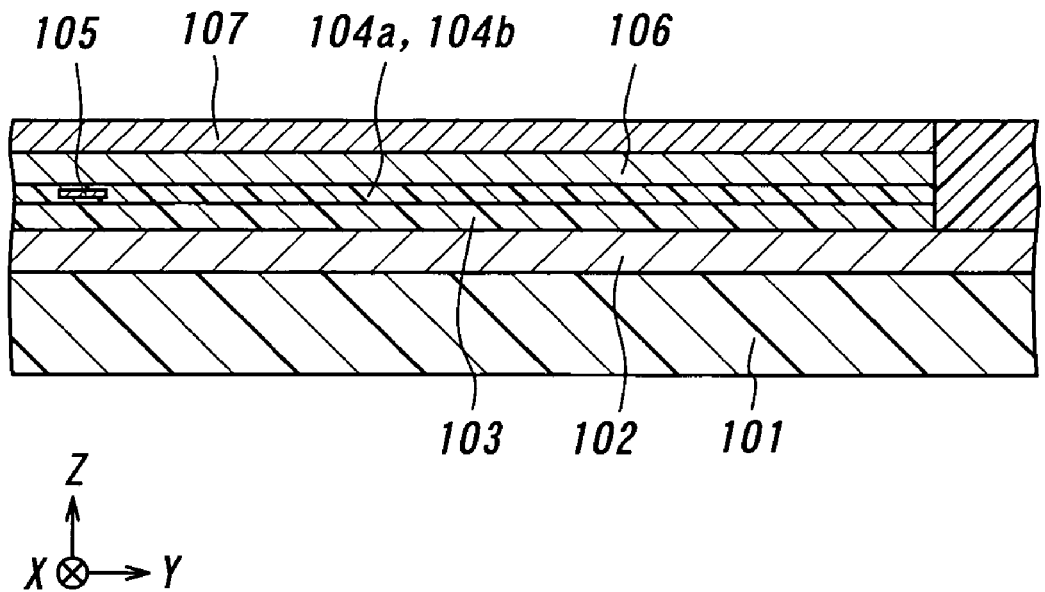
Figure 9B:
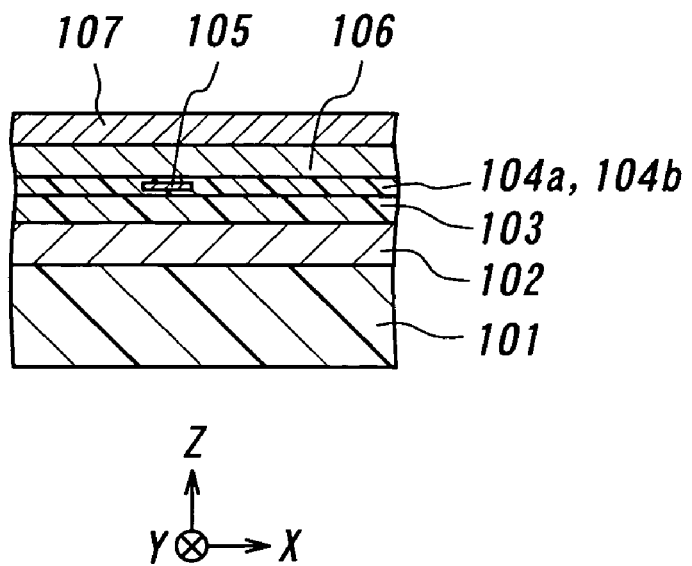

At first, as depicted in FIGS. 9A and 9B, on substrate 101 made of, e.g. AlTiC ($Al_2O_3 \cdot TiC$), is deposited an insulating film 102 made of aluminum oxide (hereinafter simply called alumina) with a thickness of about 3–5 μm.

Next, on this insulating film 102, is formed a bottom shield film 103 having a thickness of about 2 μm by selectively depositing a thin film of nickel iron alloy (FeNi; hereinafter simply called permalloy (trade name)) with the photolithography and electroplating processes.

Then, as illustrated in FIGS. 9A and 9B, on the bottom shield film 103, is formed a shield gap film 104a by depositing alumina by sputtering with a thickness of about 20–100 nm.

Next, on this shield gap film 104a, is formed an MR film 106 (sometimes call MR element) for a magnetoresistive type thin film magnetic head element for reading magnetic information. The MR film 105 is shaped into a given pattern by means of the precise photolithography process. Since the MR film 105 may be constituted by any one of many known MR films having various structures, a detailed structure of the MR film is not shown in the drawings and it detailed explanation is dispensed with.

After forming lead films (not shown) constituting electrode leads connected to the MR film 105 on respective sides of the MR film, a shield gap film 104b is formed to cover the lead films, shield gap film 104a and MR film 105. In this manner, the MR film 105 is embedded between the shield gap films 104a and 104b. For the sake of simplicity, these shield gap films 104a an 104b are denoted as a single film.

Next, on the shield gap film 104b, is selectively formed a top shield film 106 made of, for instance, permalloy by, for instance the electroplating with a thickness of about 1.5–3 μm. On the top shield film 106, is selectively formed a bottom magnetic pole 107 with a thickness of about 0.05–1.5 μm by sputtering a Fe—Co alloy containing Fe by 52–86 wt %. Alternatively, the bottom magnetic pole 107 may be formed as a double layer structure including a sputtered film of Fe—Co having Fe by an amount of 52–86 wt % formed on the top shield film 106 and an electroplated film of Fe—Co having Fe by an amount of 52–86 wt % formed on the sputtered film. According to the invention, the bottom magnetic pole 107 may be made of a permalloy or another magnetic materials having a high saturation magnetic flux density such as Ni (50)-Fe (50) and CoNiFe.

After depositing an insulating film made of, for instance, alumina on a whole upper surface of FIG. 9A, a surface of this insulating film is polished by, for instance CMP (chemical mechanical polishing) such that the bottom magnetic pole 017 is exposed to obtain a flat surface.

Figure 10A:
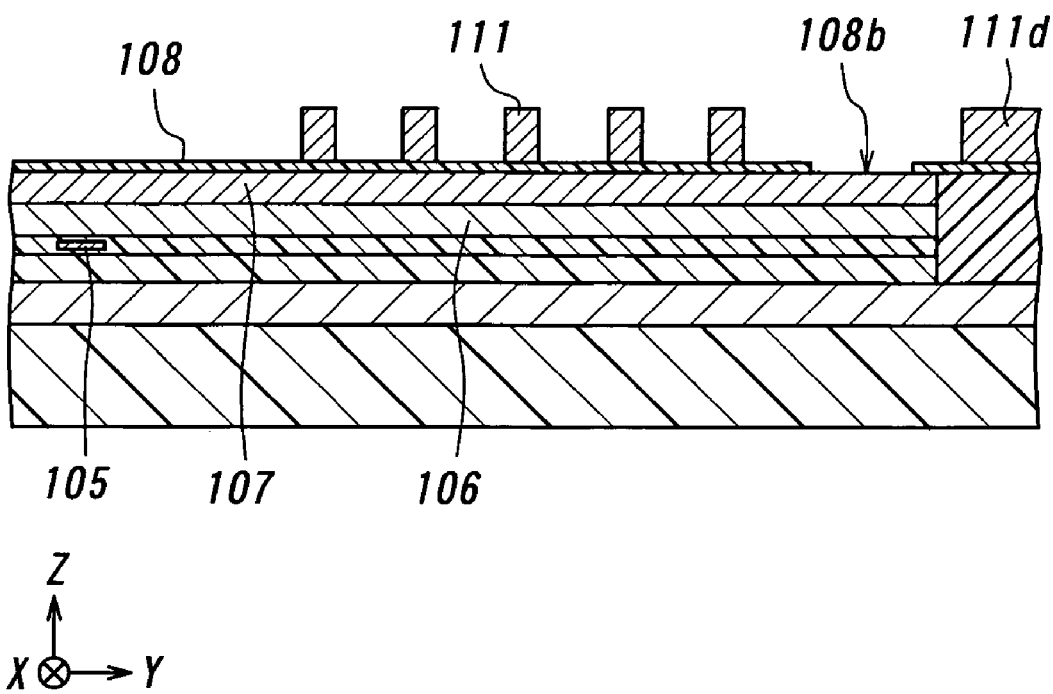
Figure 10B:
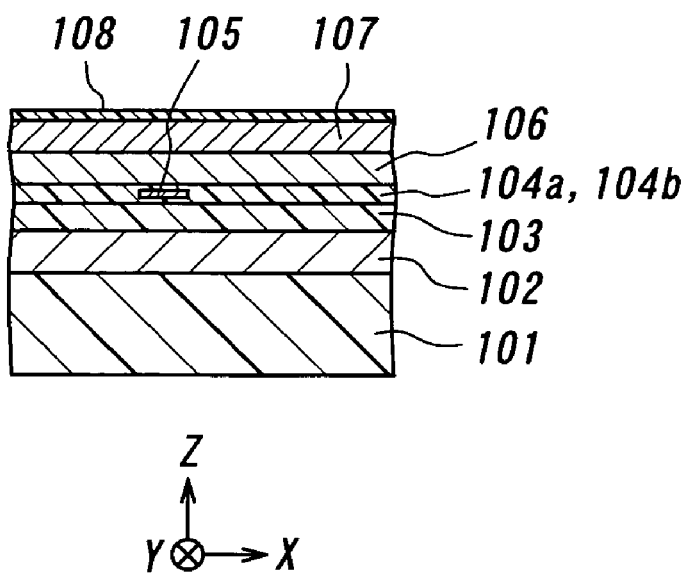

Next, as illustrated in FIGS. 10A and 10B, a write gap film 108 made of, for instance, alumina is formed on a whole surface with a thickness of about 150–300 nm. In this write gap film 108 there is formed an opening 108b for coupling the bottom magnetic pole 107 with a top magnetic pole 125 (consisting of an upper pole chip 125a, a magnetic path forming pattern 125b and an upper yoke 125c) which will be formed later.

Then, on the write gap film 108, a first layer thin film coil 111 made of copper (Cu) for the inductive type thin film magnetic head (writing head) is formed by, for instance, electroplating with a thickness of about 2–3 μm.

The thin film coil 111 has a flat coiled structure like as a conventional thin film coil. In FIG. 10A, only a part of the thin film is shown. During the formation of the thin film coil 111, a coil connecting portion 111d is formed on the write gap film 108 at an inner end portion of the thin film coil. This coil connecting portion 111d serves to electrically connect the thin film coil to an intermediate connection pattern 125d (FIG. 11A) to be formed later.

Figure 11A:
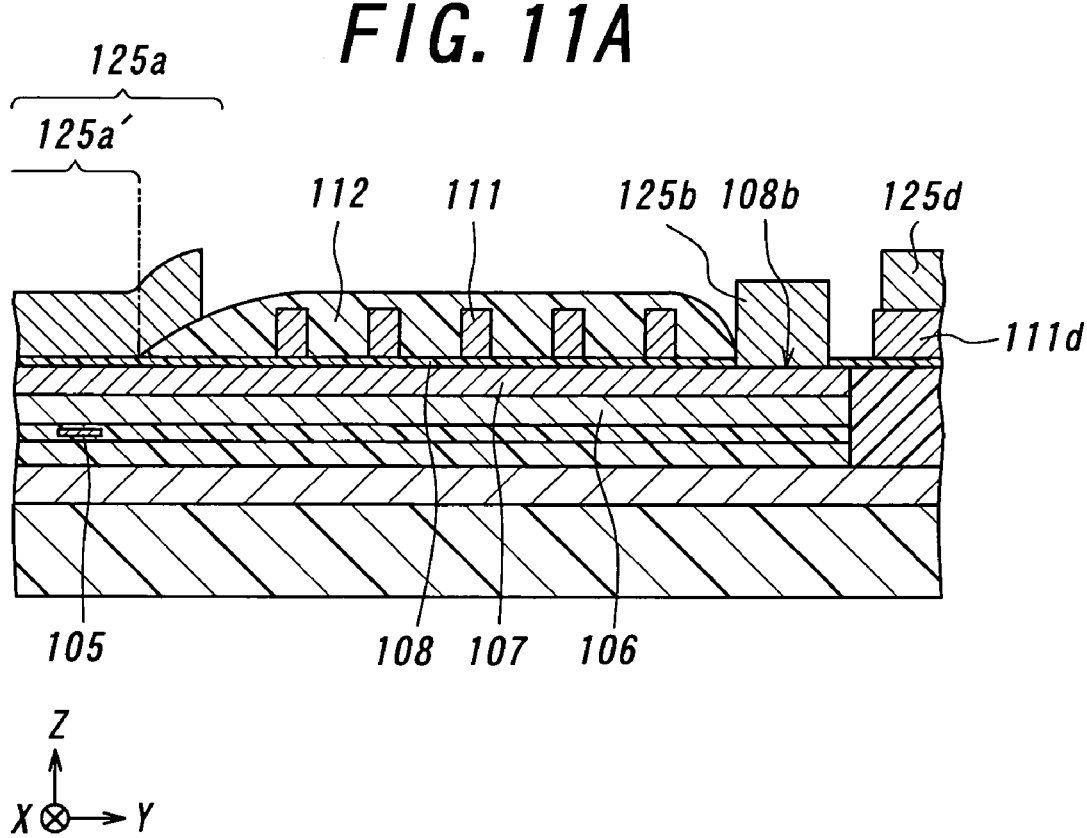

Next, as depicted in FIG. 11A, an insulating film 112 made of an organic insulating material such as photoresist which shows a floatability upon being heated is formed into a given pattern with a highly precise photolithography process such that the thin film coil 111 and surrounding write gap film 108. During the formation of such an insulating film 112, the photoresist is subjected to a heat treatment generally at a temperature of about 200° C.

Due to the above mentioned heat treatment, an end portion of the insulating film 112 is inclined as shown in FIG. 11A. The insulating film 112 defines a so-called throat height zero position (TH0 position) and is formed to fill gaps between successive coil windings of the thin film coil 111. The insulating film 112 should be formed such that the opening 108b (FIG. 10A) formed in the write gap film 108 is not filled with the insulating film.

It should be noted that a front edge of the insulating film 112 is situates backwardly with respect to a rear edge of the MR film 105, but may be positioned forwardly. It is a matter of course that the front end of the insulating film 112 may be coincided with the rear edge of the MR film 105.

Figure 11B:
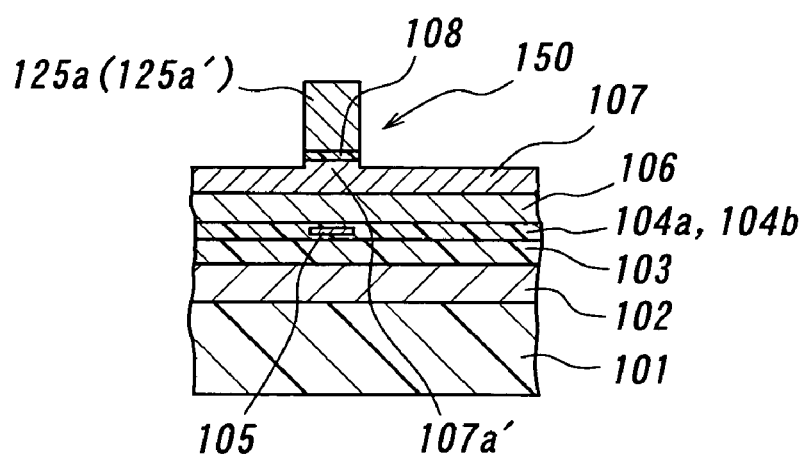
Figure 11B:
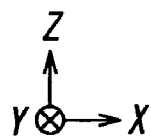

Next, as depicted in FIGS. 11A and 11B, a top pole chip 125a constituting a part of the top pole 125 is formed by a frame electroplating process with a given thickness to extend on the write gap film 108 from the inclined front end portion of the insulating film 111 (left inclined surface in FIG. 11) to a side of the air bearing surface (left hand side in FIG. 11)

Said given thickness may be preferably set to a value which is thicker than a finally obtained thickness of the top pole chip 125a by about 2 μm. This is due to a fact that a thickness of the top pole chip 125a is reduced by in later steps such as an etching process, e.g. ion milling and a CMP process.

During the formation of the top pole chip 115a, a magnetic path forming pattern 125b constituting a part of the top magnetic pole 125 is formed within the opening 108b, and an intermediate connection pattern 125d is formed on the coil connecting portion 111d.

The intermediate connection pattern 125d is formed for electrically coupling the coil connecting portion 111d with a coil connecting portion 121d to be formed later. Since the thin film coil 111 is covered with the insulating film 112, the thin film coil 111 can be protected against a bath agitation treatment during a frame electroplating process for forming the top pole chip 125a and so on.

The top pole chip 125a is formed by the following steps. At first, a Fe—Co film serving as a seed layer is formed by a high vacuum sputtering with a thickness of 50 nm on an underlying film at a portion corresponding to an area at which the top pole chip 125a is to be formed.

A thickness of the Fe—Co film formed by a high vacuum sputtering may be set to about 30–500 nm.

The Fe—Co film formed by a high vacuum sputtering constitutes a part of the top magnetic pole 125 (first magnetic pole 125) and also constitutes a seed layer serving as an electrode for an electroplating from a view point of manufacturing process. On the seed layer formed by the Fe—Co film, is formed a photoresist film by painting, and then the photoresist film is shaped into a given pattern by a photolithography process to form a frame (outer frame). Then, an electroplated thin film of Fe—Co constituting the top pole chip 125a is formed by the electroplating, while using the Fe—Co sputtered film as the seed layer and the photoresist pattern as a mask. The electroplated film of Fe—Co has a Fe concentration of 52–86 wt %. After that, as illustrated in FIG. 11B, a dry etching such as ion milling and a dry etching such as a reactive ion etching using a chloride or fluoride gas ($Cl_2$, $CF_4$, $BCl_2$, $SF_6$ and so on) are conducted utilizing the top pole chip 125a as an etching mask to etch a part of the write gap film surrounding the top pole chip and to etch the bottom magnetic pole 107 over a thickness of about 0.5 μm. In this manner, a pole portion 150 having a trim structure is formed in a self-aligned manner.

The pole portion 150 is consisting of a front end portion 125a' of the top pole chip 125a, a front end portion 107a'' of the bottom magnetic pole 107, and a part of the write gap film 108 sandwiched between the front end portions. These portions all have substantially identical widths (FIG. 11B). As can be understood from the above etching over a thickness of about 0.5 μm, the front end portion 107a' of the bottom magnetic pole 107 is formed to situate at a position remote from a reference position on a boundary surface between the second magnetic pole and the write gap film by 25 nm and include inherently the substantial air bearing surface.

It should be noted that the top pole chip 125a may be wholly by a sputtered film of Fe—Co. In this case, a maximum thickness of the sputtered film is limited to about 3000 nm. In a concrete process, a sputtered film having a given thickness is formed, and after forming a mask having a given pattern, the sputtered film is shaped into a given pole chip pattern with ion milling or reactive ion etching.

Figure 12A:
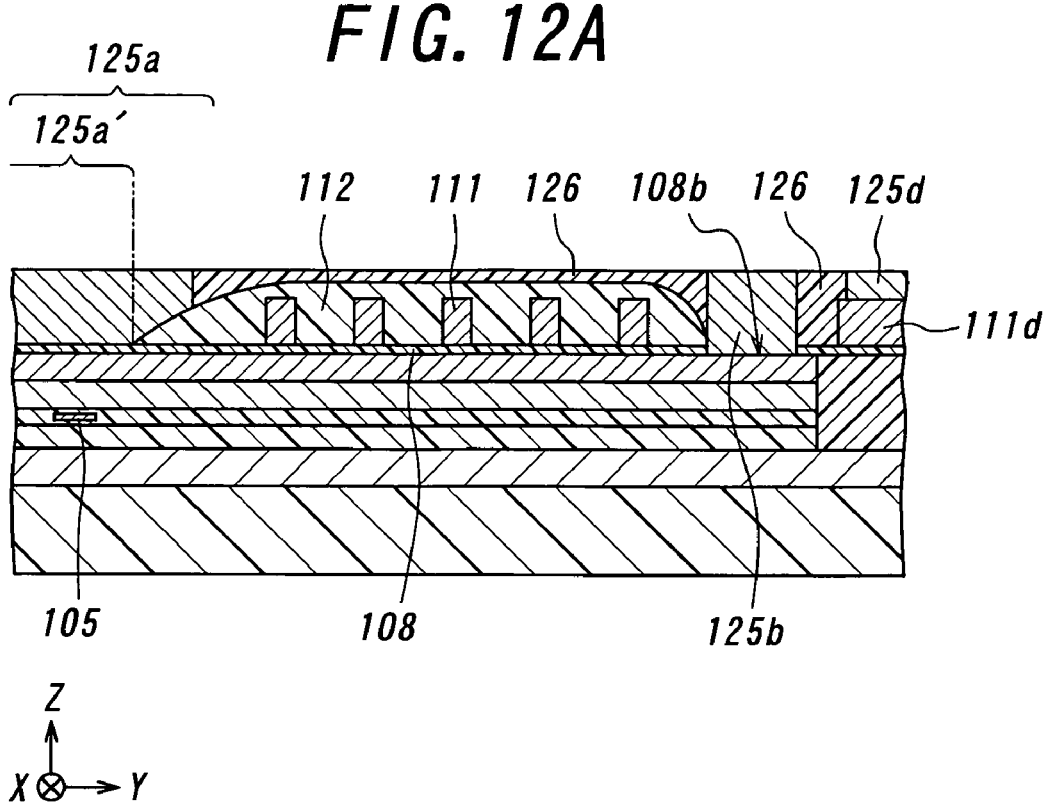
Figure 12B:
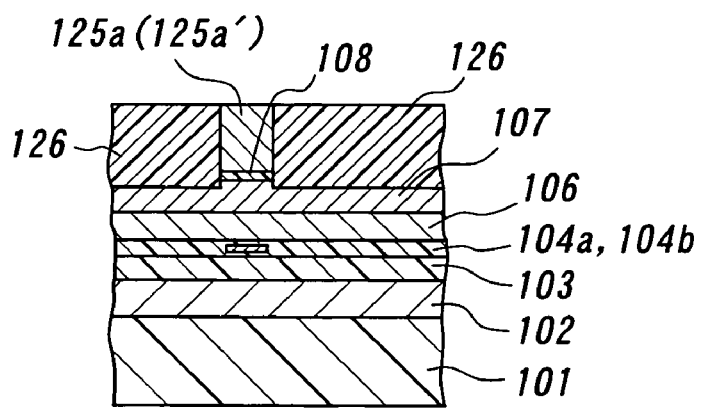

Next, as illustrated in FIGS. 12A and 12B, an insulating film 126 made of an inorganic insulating material such as alumina is formed on a whole surface with a thickness of about 3–4 μm. Then, an upper surface is polished by, for instance, CMP to form a flattened surface into which the top pole chip 125a, magnetic path forming pattern 125b and intermediate connection pattern 125d are exposed.

Figure 13A:
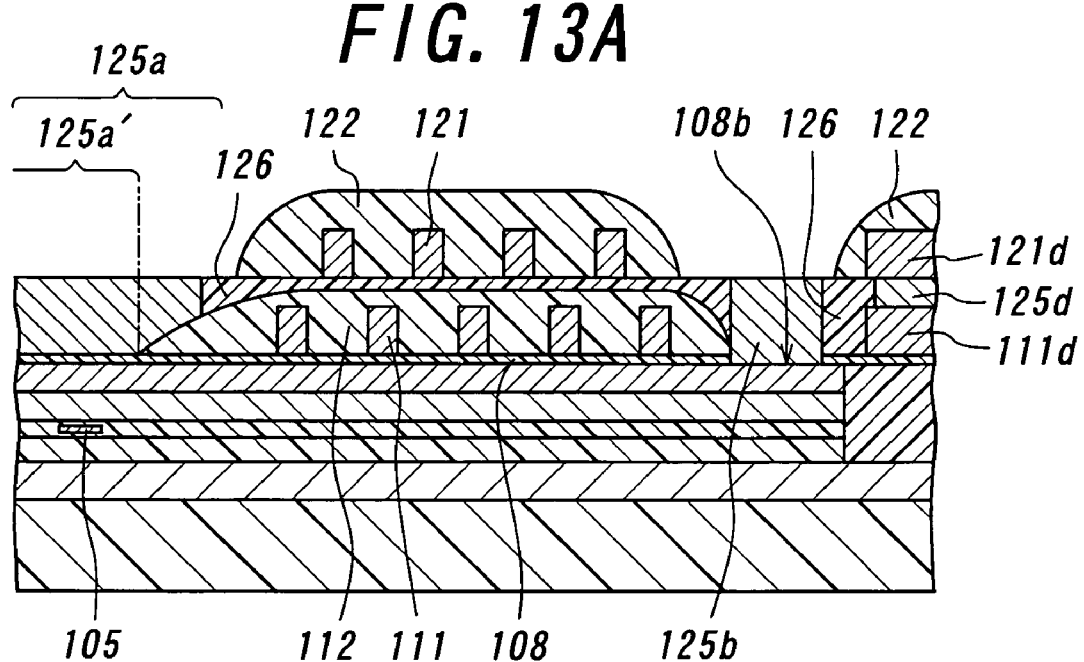
Figure 13B:
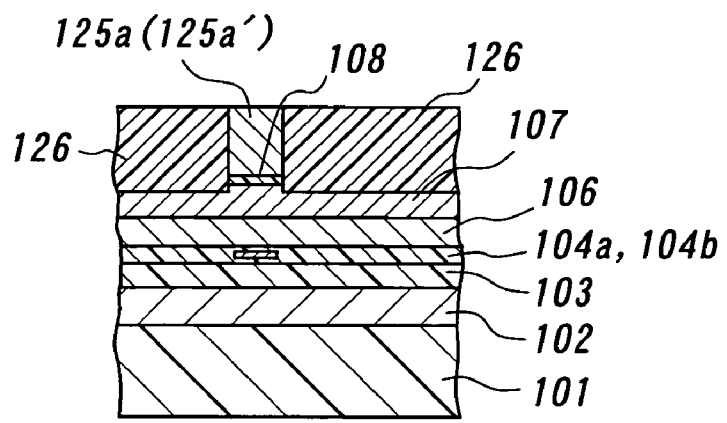

Next, as shown in FIGS. 13A and 13B, on the flattened surface, is formed a second layer thin film coil 121 made of, for instance, copper (Cu) with a thickness of about 2–3 μm by a similar electroplating process as that forming the first layer thin film coil 111. The second layer thin film coil 121 also has a flat coiled shape like as the first layer thin film coil 111.

During the formation of the second layer thin film coil 121, a coil connecting portion 121d is simultaneously formed on an intermediate connection pattern 125d at an innermost portion. Therefore, the first and second layer thin film coils 111 and 112 are electrically connected with each other by means of the coil connecting portion 111d, intermediate connection pattern 125d and coil connecting portion 121d.

Next, as illustrated in FIG. 13A, an insulating film 122 is selectively formed to cover the thin film coil 121 and surrounding insulating film 126. The insulating film 122 is made of a similar material to that of the insulating film 112 and is formed by a similar process to that forming the insulating film 112. At the same time, the insulating film 122 is formed on the coil connecting portion 121d and surrounding portion of the insulating film 126. A front end portion of the insulating film 122 is inclined like as the insulating film 112. It should be noted that upon forming the insulating film 122, an exposed surface of the magnetic path forming pattern 125b should not be covered with the insulating film 122.

Figure 14A:
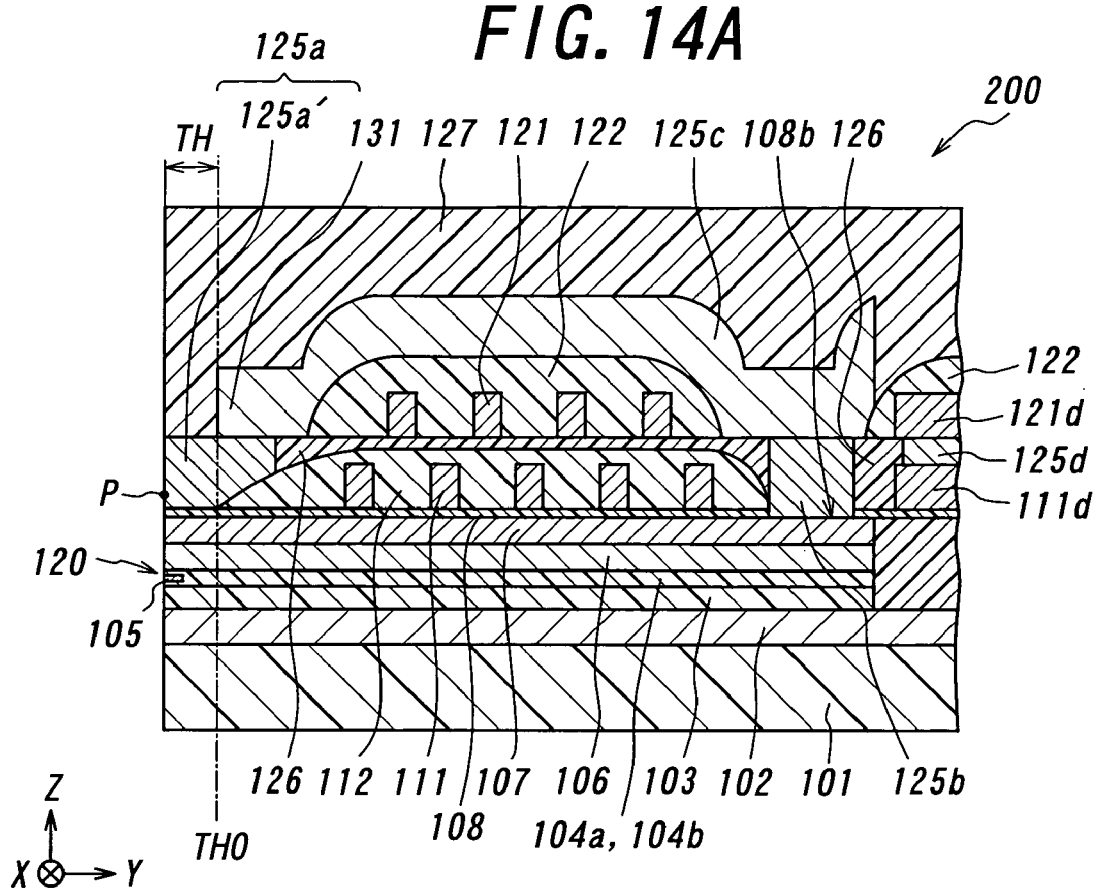
Figure 14B:
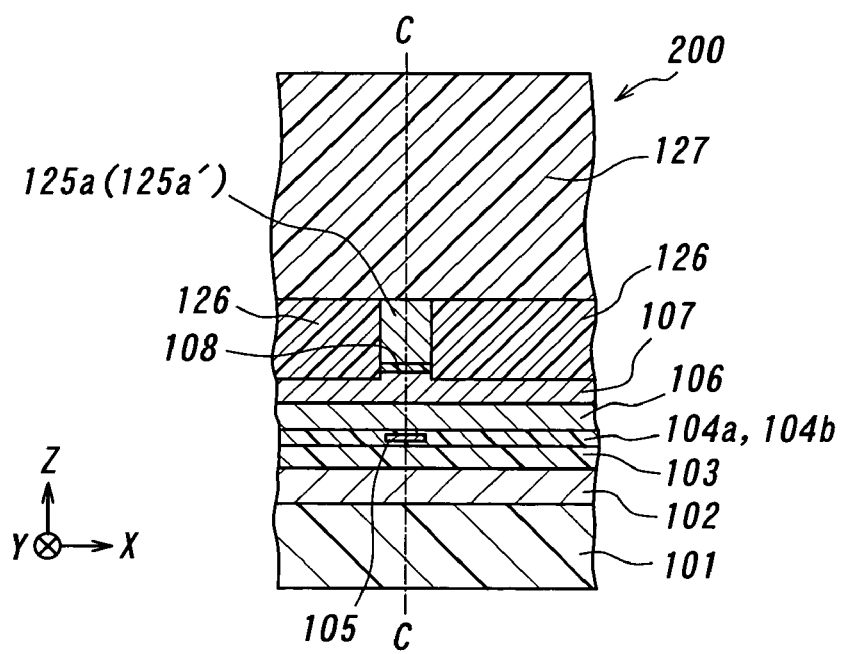

Next, as shown in FIGS. 14A and 14B, a top yoke 125c constituting a part of the top magnetic pole 125 is formed with a thickness of about 3–5 μm to cover the thin film coils 111 and 121. The top yoke 125c has a flat surface and a front end of the top pole situates at a position retarded backwardly from the air bearing surface (shown by a reference numeral 120) to be formed later. In FIG. 14A, the front end of the top yoke 125c (front edge 131) is coincided with the throat height zero position TH0, but the present invention is not limited only to such a structure.

A rear portion of the top yoke 125c is magnetically coupled with the bottom magnetic pole 107 via the magnetic path forming pattern 125d formed within the opening 108b, and a front end portion of the top yoke is magnetically coupled with the top pole chip 125a. In this manner, the magnetic core constituting the circular magnetic path is constructed.

The top pole 125c is made of a material which is essentially identical with a magnetic material of the top pole chip 125a and magnetic path forming pattern 125b as will be explained later.

Next, as depicted in FIGS. 14A and 14B, an overcoat film 127 made of, for instance, alumina is formed on a whole surface. Then, the air bearing surface 120 which is to be opposed to a magnetic record medium is formed by a mechanical processing or polishing to form the combination type thin film magnetic head is completed.

As can be seen from the above mentioned explanation, the thin film magnetic head of the present embodiment is constructed as the combination type thin film magnetic head including the magnetoresistive type thin film magnetic head element for reading magnetic information out of a magnetic record medium and an inductive type thin film magnetic head element for writing magnetic information on a magnetic record medium.

The inductive type thin film magnetic head element comprises the magnetic core portion constituting the magnetic path, the write gap film 108 formed in a part of the magnetic path, and the thin film coils 111, 121 wound around the magnetic core portion.

The magnetic core portion comprises the first and second magnetic poles opposing to each other via the write gap film 108 viewed from the air bearing surface which is opposed to the magnetic record medium. The first magnetic pole situates further remote from the magnetoresistive type thin film magnetic head element than the second magnetic pole upon being viewed from the air bearing surface. As can be understood from the above explanation, the first magnetic pole corresponds to the top magnetic pole 125 and is consisting of the top pole chip 125a, magnetic path forming pattern 125b and top yoke 125c.

The first magnetic pole (top magnetic pole 125) is consisting of the seed layer which is formed on the write gap film by the high vacuum sputtering and is substantially made of Fe—Co including Fe by an amount of 52–86 wt %, preferably 55–75 wt %, and more preferably 63–73 wt %, and the electroplated magnetic thin film which is formed on the seed layer and is made of Fe—Co including Fe by an amount of 52–86 wt %. It should be noted that the term, "substantially made of Fe—Co" is used to show a fact that according to the invention, the Fe—Co alloy may include inevitably contained oxygen atom impurity by an amount which might not affect the merit of the present invention. The inventors have found from the detailed and full study that a concentration of the oxygen atom impurity should be controlled particularly at a position of the top magnetic pole 125 near the write gap film. At an effective boundary between the top magnetic pole and the write gap film, introduction of oxygen into the magnetic material through the boundary surface could not be avoided, because the write gap film is generally formed by an oxide film. However, at other positions, the Fe—Co film should exclude oxygen as far as possible. Particularly, the inventors have found from the detailed and full study that a purity of Fe—Co of the Fe—Co film formed by a high vacuum sputtering and serving as the seed layer is particularly important.

According to the invention, the seed layer constituting a part of the top magnetic pole 125 near the write gap film is substantially consisting of Fe—Co (Fe=52–86 wt %), and an amount of oxygen at a reference point (point P in FIG. 14A) is limited to 0.01–5.0 wt %, particularly 0.01–2.0 wt %, and more particularly 0.01–0.5 wt %, said reference point being on a central line (a broken line C—C in FIG. 14B) bisecting a width of the pole portion on the effective air bearing surface and being separated from the boundary surface between the write gap film and the seed layer by 25 nm When an amount of oxygen at the reference point exceeds 5.0 wt %, a saturation magnetic flux density is liable to decrease and a superior overwrite property could no more attained. It is preferable that a lower limit of oxygen concentration is set to a value closer to zero, but from a point of the manufacturing process, a lower limit is set to 0.01 wt %. An oxygen concentration cam be measured preferably by the Auger electron spectroscopy (accelerating voltage: 5 kV, illuminating current: 100 nA, Ar etching acceleration voltage: 3 kV).

In a concrete embodiment for preventing the introduction of oxygen atom impurity, the sputtering is conducted under an extremely high vacuum.

In the present embodiment, the top magnetic pole is consisting of the seed layer of Fe—Co (Fe=52–86 wt %) formed on the write gap film and the electroplated magnetic thin film of Fe—Co (Fe=52–86 wt %) formed on the seed layer, and a thickness of the seed layer is set to 50 nm. According to the invention, a thickness of the seed layer may be not less than 30 nm. Furthermore, the top magnetic pole as a whole may be formed by a sputtered film of Fe—Co containing Fe by a ratio of 52–86 wt %, but it is preferable to form the top magnetic pole by the thin seed layer and the electroplated film formed on the seed layer.

The Fe—Co film formed on the write gap film as the seed layer constituting the top magnetic pole 125 has preferably a coercive force in an axis of easy magnetization of 400 A/m–16000 A/m (5 Oe–200 Oe). A coercive force may be measured by a so-called BH tracer.

The Fe—Co film formed on the write gap film as the seed layer constituting the top magnetic pole 125 should have a positive magnetostriction constant. It is preferable that the seed layer has a magnetostriction constant of about $1.0 \times 10^{-6}$–$3.5 \times 10^{-5}$. A magnetostriction constant can be measured by a so-called optical lever method.

The other magnetic pole (bottom magnetic pole 107) constituting the circular magnetic path is preferably formed to have a substantially identical structure as the above mentioned top magnetic pole.

That is to say, a part of the bottom magnetic pole 107 near the write gap film or the bottom magnetic pole as a whole is substantially consisting of Fe—Co (Fe=52–86 wt %, preferably 55–75 wt %, and more preferably 63–73 wt %,), and an amount of oxygen at a reference point is limited to 0.01–5.0 wt %, particularly 0.01–2.0 wt %, and more particularly 0.01–0.5 wt %, said reference point being on a central line bisecting a width of the pole portion on the effective air bearing surface and being separated from the boundary surface between the write gap film and the bottom magnetic pole by 25 nm When an amount of oxygen at the reference point exceeds 5.0 wt %, a saturation magnetic flux density is liable to decrease and a superior overwrite property could no more attained. It is preferable that a lower limit of oxygen concentration is set to a value closer to zero, but from a point of the manufacturing process, a lower limit is set to 0.01 wt %.

Upon forming the bottom magnetic pole having the above mentioned property, a Fe—Co thin film containing Fe by an amount of 52–86 wt % is first formed by sputtering on the top shield film, then an electroplated thin film of Fe—Co containing Fe by an amount of 52–86 wt % is formed while using said Fe—Co film as a seed layer, and furthermore a Fe—Co thin film containing Fe by an amount of 52–86 wt % is formed on the electroplated Fe—Co film by sputtering under an extremely high vacuum. The last mentioned Fe—Co sputtered film may have a thickness of 30–500 nm.

The Fe—Co film formed by the extremely high vacuum sputtering has preferably a coercive force in an axis of easy magnetization of 400 A/m–16000 A/m (5 Oe–200 Oe).

Furthermore, the Fe—Co film formed by the extremely high vacuum sputtering should have a positive magnetostriction constant. It is preferable that the seed layer has a magnetostriction constant of about $1.0 \times 10^{-6}$–$3.5 \times 10^{-5}$.

According to the invention, the magnetoresistive type thin film magnetic head element 105 for reading magnetic information out of a magnetic record medium may be formed by any known type element such as an AMR (anisotropic magnetoresistive) element, a TMR (tunnel junction type magnetoresistive) element or a GMR (giant magnetoresistive) element, e.g. CPP (Current Perpendicular Plane) type element.

Now numerical examples of various matters of the combination type thin film magnetic head according to the invention will be described.

substrate 101: AlTiC ($Al_2O_3TiC$)
insulating film 102: alumina $Al_2O_3$ (thickness 5 μm)
bottom shield film 103: permalloy (thickness 2 μm)
shield gap film 104a, 104b (thickness 50 nm)
MR film 105: GMR element structure

| [GMR Element Structure] | |
|---|---|
| antiferromagnetic layer: | PtMn (thickness 15 nm) |
| ferromagnetic pinned layer: | CoFe (thickness 4.5 nm) |
| nonmagnetic metal layer: | Cu (thickness 2 nm) |
| ferromagnetic free layer: | stack of Co—Fe (thickness 2 nm)/ Ni—Fe (thickness 2 nm) |

| | |
|---|---|
| top shield film 106: | permalloy (thickness 2 µm) |
| bottom magnetic pole: | the Fe—Co seed layer is formed by sputtering, the Fe—Co electroplated film is deposited on the seed layer with a thickness of 2.0 µm, and the Fe—Co film is formed on the electroplated film by extremely high vacuum sputtering and is shaped into a given pattern by lift-off. |
| write gap film 108: | alumina (thickness 200 nm) |
| thin film coil 111, 121: | Cu (thickness 200 nm) |
| top magnetic pole 125: | the Fe—Co seed layer is formed by magnetron sputtering with a thickness of 50 nm, and the Fe—Co electroplated film is deposited on the seed |

The magnetron sputtering forming the Fe—Co seed layer is conducted under the following conditions:
target: $Fe_{66}$—Co
supply power: 1500 W (4.6 W/cm$^2$)
Ar gas pressure: 0.25 Pa
substrate bias: −100 V
target-substrate distance: 175 mm
deposition rate: ~15 nm/min Several samples of the Fe—Co seed layers are formed by changing composition and magnetic properties are measured. Furthermore, an over-write property is estimated under conditions explained below.

Over-write Property

The measurement is carried out under the following conditions:
writing frequency: 200 MHz
writing current: 45 mA
record medium Hc: 312000 (A/m)
record medium rotation speed: 7200 rpm From the above measurement, it has been confirmed that a very high over-write property of about 34–40 dB can be attained by limiting an amount of oxygen contained in the Fe—Co seed layer containing Fe by 50–90 wt % at the reference point separated from the write gap film by 25 nm to a value within a range of 0.01–5.0 atom %.

As explained above, in the combination type thin film magnetic head including the magnetoresistive type thin film magnetic head element for reading magnetic information out of a magnetic record medium and the inductive type thin film magnetic head element for writing magnetic information on a magnetic record medium according to the invention, the top magnetic pole 125 is formed by the seed layer essentially consisting of Fe—Co (Fe=50–90 wt %) and having an oxygen concentration of 0.01–5.0 at% at the reference position on a central line bisecting a width of the pole portion on the air bearing surface and being separated from the boundary surface between the write gap film and the seed layer by 25 nm, and the electroplated magnetic thin film of Fe—Co alloy containing Fe by an amount of 52–86 wt %. Therefore, the over-write property for attaining a high recording density can be improved materially and the writing property of the head can be improved to a great extent.

The present invention is not limited to the embodiments so far explained, but various alternations and modifications may be conceived. For instance, in the above explained embodiments, a pulsatory current having a duty cycle of 1 in which a duration of a high current level is identical with that of a low current level, but according to the invention, it is not always necessary to such a pulsatory current.

In the above embodiments, the electroplating baths contain iron sulfate, 7-hydrate serving as the supply source of Fe ions and cobalt sulfate, 7-hydrate and cobalt chloride, 6-hydrate serving as the supply source of Co ions, but according to the invention electroplating bath may contain other sulfate salts and hydrochloric salts. Moreover, boric acid is used as the pH buffer agent, ammonium chloride is used as the electrically conductive salt, and sodium lauryl chloride is used as the stress relaxation agent, but according to the invention any other substances may be used.

In the above embodiments, use is made of the paddle electroplating method, in which the anode and cathode are mutually opposed to each other within the electroplating bath arranged in a magnetic field, the paddle arranged on the cathode and supporting plural substrates is rotated, the electroplating bath is circulated within the electroplating tank and a pulsatory current or direct current is supplied between the cathode and the anode. However, according to the invention, another electroplating method may be utilized.

In the embodiment of the thin film magnetic head illustrated in FIG. 1, the electroplated magnetic thin film according to the invention is used as the top pole chip defining a track width, but such an electroplated magnetic thin film may be used as the bottom pole and top pole. Furthermore, the thin film magnetic head is constructed as the normal type combination type thin film magnetic head in which the inductive type thin film magnetic head element is stacked on the magnetoresistive type thin film magnetic head element, but according to the invention, the combination type thin film magnetic head may be constructed as a reverse type magnetic head in which the magnetoresistive type thin film magnetic head element is stacked on the inductive type thin film magnetic head element. Alternatively, the thin film magnetic head according to the invention may be constructed as an inductive type thin film magnetic head without a magnetoresistive type thin film magnetic head.

The invention claimed is:

1. A thin film magnetic head comprising:
a first magnetic thin film having a pole portion which is to be opposed to a magnetic record medium;
a second magnetic thin film having a pole portion constituting an air bearing surface together with the pole portion of the first magnetic thin film, and being magnetically coupled with the first magnetic thin film at a back gap position remote from the air bearing surface;
a write gap film made of a non-magnetic material and interposed between the pole portion of the first magnetic thin film and the pole portion of the second magnetic thin film at at least the air bearing surface;
a thin film coil having a portion arranged between said first magnetic thin film and the second magnetic thin film in an insulated and isolated manner; and
a substrate supporting said first and second magnetic thin films, write gap film and thin film coil;
wherein said second magnetic thin film includes a top pole chip constituting said pole portion of the second magnetic thin film and a top pole having one end coupled with the top pole chip and the other end coupled with said first magnetic thin film at the back gap position, and said top pole chip includes an electroplated magnetic thin film made of Fe—Co alloy containing Fe by an amount of 52–86 wt %, wherein said thin film magnetic head is formed as a combination type thin film magnetic head, in which a magnetoresistive type thin film magnetic head element for reading magnetic information out of a magnetic record medium and an inductive type thin film magnetic head element for recoding the magnetic information on the magnetic record medium, and the top pole chip of said second magnetic thin film opposite to the magnetoresistive type thin film magnetic head element with respect to the write gap film is consisting of a sputtered thin film of Fe—Co alloy containing Fe by 52–86 wt % and an electroplated thin film of Fe—Co containing Fe by 52–86 wt % formed by an electroplating process using said sputtered thin film as seed layer, said sputtered thin film of Fe—Co alloy containing oxygen by an amount of 0.01–5.0 atomic % measured at a position which is substantially on an effective air bearing surface and is separated from a reference point by 25 nm, said reference point situating on a bisecting center line of a width of the pole portion as well as on a boundary surface between the second magnetic thin film and the write gap film.

2. The thin film magnetic head according to claim 1, wherein said electroplated magnetic thin film has a saturation magnetic flux density not less than 2.1 T.

3. The thin film magnetic head according to claim 1, wherein said electroplated magnetic thin film contains Fe by an amount of 58–70 wt %.

4. The thin film magnetic head according to claim 3, wherein said electroplated magnetic thin film has a saturation magnetic flux density not less than 2.2 T.

5. The thin film magnetic head according to claim 1, wherein said electroplated magnetic thin film has a coercive force in an axis of hard magnetization of 5–10 Oe.

6. The thin film magnetic head according to claim 1, wherein said electroplated magnetic thin film is formed by an electroplating process using a pulsatory current.

7. The thin film magnetic head according to claim 1, wherein said seed layer of the second magnetic thin film contains Fe by an amount of 55–75 wt %.

8. The thin film magnetic head according to claim 7, wherein said seed layer of the second magnetic thin film contains Fe by an amount of 63–73 wt %.

9. The thin film magnetic head according to claim 1, wherein said seed layer of the second magnetic thin film has a coercive force in an axis of easy magnetization of 400–16000 A/m (5–200 Oe).

10. The thin film magnetic head according to claim 1, wherein said seed layer of the second magnetic thin film has a thickness of 30–500 nm.

11. A thin film magnetic head comprising:
a first magnetic thin film having a bottom pole portion which is to be opposed to a magnetic record medium;
a second magnetic thin film having a top pole portion constituting an air bearing surface together with the bottom pole portion of the first magnetic thin film, and being magnetically coupled with the first magnetic thin film at a back gap position remote from the air bearing surface;
a write gap film made of a non-magnetic material and being interposed between the bottom pole portion of the first magnetic thin film and the top pole portion of the second magnetic thin film at at least the air bearing surface;
a thin film coil having a portion arranged between said first magnetic thin film and the second magnetic thin film in an insulated and isolated manner; and
a substrate supporting said first and second magnetic thin films, write gap film and thin film coil;
wherein said second magnetic thin film includes a top pole chip constituting said top pole portion of the second magnetic thin film and a top pole having one end coupled with the top pole chip and the other end coupled with said first magnetic thin film at the back gap position, said top pole chip is formed by an electroplated magnetic thin film made of Fe—Co alloy containing Fe by an amount of 52–86 wt %, and said top pole is formed by a sputtered film of Fe—Co alloy containing Fe by an amount of 52–86 wt %, wherein said thin film magnetic head is formed as a combination type thin film magnetic head, in which a magnetoresistive type thin film magnetic head element for reading magnetic information out of a magnetic record medium and an inductive type thin film magnetic head element for recoding the magnetic information on the magnetic record medium, and the top pole chip of said second magnetic thin film opposite to the magnetoresistive type thin film magnetic head element with respect to the write gap film is consisting of a sputtered thin film of Fe—Co alloy containing Fe by 52–86 wt % and an electroplated thin film of Fe—Co containing Fe by 52–86 wt % formed by an electroplating process using said sputtered thin film as seed layer, said sputtered thin film of Fe—Co alloy containing oxygen by an amount of 0.01–5.0 atomic % measured at a position which is substantially on an effective air bearing surface and is separated from a reference point by 25 nm, said reference point situating on a bisecting center line of a width of the pole portion as well as on a boundary surface between the second magnetic thin film and the write gap film.

12. The thin film magnetic head according to claim 11, wherein said electroplated magnetic thin film has a saturation magnetic flux density not less than 2.1 T.

13. The thin film magnetic head according to claim 11, wherein said electroplated magnetic thin film contains Fe by an amount of 58–70 wt %.

14. The thin film magnetic head according to claim 13, wherein said electroplated magnetic thin film has a saturation magnetic flux density not less than 2.2 T.

15. The thin film magnetic head according to claim 11, wherein said electroplated magnetic thin film has a coercive force in an axis of hard magnetization of 5–10 Oe.

16. The thin film magnetic head according to claim 11, wherein said electroplated magnetic thin film is formed by an electroplating process using a pulsatory current.

17. The thin film magnetic head according to claim 11, wherein said seed layer of the second magnetic thin film contains Fe by an amount of 55–75 wt %.

18. The thin film magnetic head according to claim 17, wherein said seed layer of the second magnetic thin film contains Fe by an amount of 63–73 wt %.

19. The thin film magnetic head according to claim 11, wherein said seed layer of the second magnetic thin film has a coercive force in an axis of easy magnetization of 400–16000 A/m (5–200 Oe).

20. The thin film magnetic head according to claim 11, wherein said seed layer of the second magnetic thin film has a thickness of 30–500 nm.

21. A thin film magnetic head comprising:
a first magnetic thin film having a bottom pole portion which is to be opposed to a magnetic record medium;
a second magnetic thin film having a top pole portion constituting an air bearing surface together with the bottom pole portion of the first magnetic thin film and being magnetically coupled with the first magnetic thin film at a back gap position remote from the air bearing surface;

a write gap film made of a nonmagnetic material and being interposed between the bottom pole portion of the first magnetic thin film and the top pole portion of the second magnetic thin film at at least the air bearing surface;

a thin film coil having a portion arranged between said first magnetic thin film and the second magnetic thin film in an insulated and isolated manner; and a substrate supporting said first and second magnetic thin films, write gap film and thin film coil:

wherein said second magnetic thin film includes a top pole chip constituting said top pole portion of the second magnetic thin film and a top pole having one end coupled with the top pole chip and the other end coupled with said first magnetic thin film at the back gap position, said top pole chip is formed by an electroplated magnetic thin film made of Fe—Co alloy containing Fe by an amount of 52–86 wt %, and said top pole is formed by a Fe—Ni alloy film, wherein said thin film magnetic head is formed as a combination type thin film magnetic head, in which a magnetoresistive type thin film magnetic head element for reading magnetic information out of a magnetic record medium and an inductive type thin film magnetic head element for recoding the magnetic information on the magnetic record medium, and the top pole chip of said second magnetic thin film opposite to the magnetoresistive type thin film magnetic head element with respect to the write gap film is consisting of a sputtered thin film of Fe—Co alloy containing Fe by 52–86 wt % and an electroplated thin film of Fe—Co containing Fe by 52–86 wt % formed by an electroplating process using said sputtered thin film as seed layer, said sputtered thin film of Fe—Co alloy containing oxygen by an amount of 0.01–5.0 atomic % measured at a position which is substantially on an effective air bearing surface and is separated from a reference point by 25 nm, said reference point situating on a bisecting center line of a width of the pole portion as well as on a boundary surface between the second magnetic thin film and the write gap film.

22. The thin film magnetic head according to claim 21, wherein said electroplated magnetic thin film has a saturation magnetic flux density not less than 2.1 T.

23. The thin film magnetic head according to claim 21, wherein said electroplated magnetic thin film contains Fe by an amount of 58–70 wt %.

24. The thin film magnetic head according to claim 23, wherein said electroplated magnetic thin film has a saturation magnetic flux density not less than 2.2 T.

25. The thin film magnetic head according to claim 21, wherein said electroplated magnetic thin film has a coercive force in an axis of hard magnetization of 5–10 Oe.

26. The thin film magnetic head according to claim 21, wherein said electroplated magnetic thin film is formed by an electroplating process using a pulsatory current.

27. The thin film magnetic head according to claim 21, wherein said seed layer of the second magnetic thin film contains Fe by an amount of 55–75 wt %.

28. The thin film magnetic head according to claim 27, wherein said seed layer of the second magnetic thin film contains Fe by an amount of 63–73 wt %.

29. The thin film magnetic head according to claim 21, wherein said seed layer of the second magnetic thin film has a coercive force in an axis of easy magnetization of 400–16000 A/m (5–200 Oe).

30. The thin film magnetic head according to claim 21, wherein said seed layer of the second magnetic thin film has a thickness of 30–500 nm.

* * * * *